(12) United States Patent
Desai

(10) Patent No.: US 8,768,866 B2
(45) Date of Patent: Jul. 1, 2014

(54) COMPUTER-IMPLEMENTED SYSTEMS AND METHODS FOR FORECASTING AND ESTIMATION USING GRID REGRESSION

(75) Inventor: Vijay S. Desai, San Diego, CA (US)

(73) Assignee: SAS Institute Inc., Cary, NC (US)

( * ) Notice: Subject to any disclaimer, the term of this patent is extended or adjusted under 35 U.S.C. 154(b) by 288 days.

(21) Appl. No.: 13/278,972

(22) Filed: Oct. 21, 2011

(65) Prior Publication Data

US 2013/0103617 A1    Apr. 25, 2013

(51) Int. Cl.
*G06F 15/18* (2006.01)

(52) U.S. Cl.
USPC .......................................................... 706/12

(58) Field of Classification Search
USPC .......................................................... 706/12
See application file for complete search history.

(56) References Cited

U.S. PATENT DOCUMENTS

| | | |
|---|---|---|
| 5,335,291 A | 8/1994 | Kramer et al. |
| 5,500,513 A | 3/1996 | Langhans et al. |
| 5,519,319 A | 5/1996 | Smith et al. |
| 5,650,722 A | 7/1997 | Smith et al. |
| 5,675,253 A | 10/1997 | Smith et al. |
| 5,677,955 A | 10/1997 | Doggett et al. |
| 5,761,442 A | 6/1998 | Barr et al. |
| 5,819,226 A | 10/1998 | Gopinathan et al. |
| 5,884,289 A | 3/1999 | Anderson et al. |
| 5,903,830 A | 5/1999 | Joao et al. |
| 5,999,596 A | 12/1999 | Walker et al. |
| 6,021,943 A | 2/2000 | Chastain |
| 6,029,154 A | 2/2000 | Pettitt |
| 6,047,268 A | 4/2000 | Bartoli et al. |
| 6,064,990 A | 5/2000 | Goldsmith |
| 6,122,624 A | 9/2000 | Tetro et al. |
| 6,125,349 A | 9/2000 | Maher |
| 6,128,602 A | 10/2000 | Northington et al. |
| 6,170,744 B1 | 1/2001 | Lee et al. |
| 6,330,546 B1 | 12/2001 | Gopinathan et al. |
| 6,388,592 B1 | 5/2002 | Natarajan |
| 6,422,462 B1 | 7/2002 | Cohen |
| 6,453,206 B1 | 9/2002 | Soraghan et al. |

(Continued)

OTHER PUBLICATIONS

Abdel-Wahhab, O. et al., "Image compression using multi-layer neural networks,", Proceedings of the Second IEEE Symposium on Computers and Communications, vol. 144, Issue 5, pp. 307-312 (Oct. 1997).

(Continued)

*Primary Examiner* — Michael B Holmes
(74) *Attorney, Agent, or Firm* — Kilpatrick Townsend & Stockton LLP

(57) ABSTRACT

Systems and methods are provided for estimating a value for a target variable. A plurality of known entities are assigned to cells of a grid, where the known entities are assigned to the cells based upon attribute data. A determination is made as to whether each cell has at least a threshold number of assigned known entities. When one of the cells contains fewer than the threshold number of known entities, cells are combined to form a super cell. A model is generated for each cell and super cell based upon target variable values for known entities assigned to that cell or super cell. Data for a target entity is received, and the target entity is assigned to one the cells. One of the models is selected based upon the cell assignment, and an estimate is generated for the target variable for the target entity using the selected model.

66 Claims, 21 Drawing Sheets

(56) References Cited

U.S. PATENT DOCUMENTS

| | | | |
|---|---|---|---|
| 6,516,056 | B1 | 2/2003 | Justice et al. |
| 6,549,861 | B1 | 4/2003 | Mark et al. |
| 6,570,968 | B1 | 5/2003 | Marchand et al. |
| 6,601,049 | B1 | 7/2003 | Cooper |
| 6,631,212 | B1 | 10/2003 | Luo et al. |
| 6,650,779 | B2 | 11/2003 | Vachtesvanos et al. |
| 6,675,145 | B1 | 1/2004 | Yehia et al. |
| 6,678,640 | B2 | 1/2004 | Ishida et al. |
| 7,117,191 | B2 | 10/2006 | Gavan et al. |
| 7,191,150 | B1 | 3/2007 | Shao et al. |
| 7,269,516 | B2 | 9/2007 | Brunner et al. |
| 7,403,922 | B1 | 7/2008 | Lewis et al. |
| 7,455,226 | B1 | 11/2008 | Hammond et al. |
| 7,461,048 | B2 | 12/2008 | Teverovskiy et al. |
| 7,467,119 | B2 | 12/2008 | Saidi et al. |
| 7,480,640 | B1 | 1/2009 | Elad et al. |
| 7,536,348 | B2 | 5/2009 | Shao et al. |
| 7,562,058 | B2 | 7/2009 | Pinto et al. |
| 7,580,798 | B2 | 8/2009 | Brunner et al. |
| 7,761,379 | B2 | 7/2010 | Zoldi et al. |
| 7,765,148 | B2 | 7/2010 | German et al. |
| 8,015,133 | B1 * | 9/2011 | Wu et al. .................. 706/21 |
| 8,190,512 | B1 * | 5/2012 | Subramanian et al. ......... 705/38 |
| 8,346,691 | B1 * | 1/2013 | Subramanian et al. ......... 706/15 |
| 2002/0099635 | A1 | 7/2002 | Guiragosian |
| 2002/0138417 | A1 | 9/2002 | Lawrence |
| 2002/0194119 | A1 | 12/2002 | Wright et al. |
| 2003/0093366 | A1 | 5/2003 | Halper et al. |
| 2003/0097330 | A1 | 5/2003 | Hillmer et al. |
| 2003/0191709 | A1 | 10/2003 | Elston et al. |
| 2004/0039688 | A1 | 2/2004 | Sulkowski et al. |
| 2005/0055373 | A1 | 3/2005 | Forman |
| 2005/0131873 | A1 | 6/2005 | Fan et al. |
| 2006/0020814 | A1 | 1/2006 | Lieblich et al. |
| 2006/0181411 | A1 | 8/2006 | Fast et al. |
| 2006/0218169 | A1 | 9/2006 | Steinberg et al. |
| 2007/0192167 | A1 | 8/2007 | Lei et al. |
| 2007/0239606 | A1 | 10/2007 | Eisen |
| 2008/0133518 | A1 | 6/2008 | Kapoor et al. |
| 2008/0134236 | A1 | 6/2008 | Iijima et al. |

OTHER PUBLICATIONS

Almgren, Magnus et al., "Using Active Learning in Intrusion Detection," Proceedings of the 17th IEEE Computer Security Foundations Workshop, 11 pp. (2004).

Andras, Peter, "The Equivalence of Support Vector Machine and Regularization Neural Networks," Neural Processing Letters, 65, pp. 97-104 (2002).

Brause, Rudiger W., "Cascaded Vector Quantization by Non-Linear PCA Network Layers", IEEE, pp. 154-160 (1994).

Chan, Lipchen Alex et al., "Automatic target detection using dualband infrared imager", Acoustics, Speech, and Signal PICASSP'00. Proceedings, 2000 IEEE International Conference, pp. 2286-2289 (Jun. 9, 2000).

Chatterjee, Chanchal et al., "Self-Organizing Algorithms for Generalized Eigen-Decomposition", IEEE Transactions on Neural Networks, vol. 8, No. 6, pp. 1518-1530 (Nov. 1997).

Chen, Yupeng et al., "High Resolution Adaptive Bearing Estimation Using a Complex-Weighted Neural Network", IEEE, 0-7803-0532-9/92, pp. II-317-IIII-320 (1992).

Gabrys, Bogdan et al., "Combining labeled and unlabelled data in the design of pattern classification systems," International Journal of Approximate Reasoning, 35, pp. 251-273 (2004).

Gunter, Simon, "Multiple Classifier Systems in Offline Cursive Handwriting Recognition," cover page and p. 4 (2004).

Hawkins, Simon et al., "Outlier Detection Using Replicator Neural Networks," Proceedings of the Fifth International Conference and Data Warehousing and Knowledge Discovery, 10 pp. (2002).

Hinterseer, Kris, "The Wolfsberg Anti-Money Laundering Principles," Journal of Money Laundering Control, vol. 5, No. 1 pp. 25-41 (Summer 2001).

Hodge, Victoria J. et al., "A Survey of Outlier Detection Methodologies," Artificial Intelligence Review, vol. 22, pp. 85-126 (2004).

Lazarevic, Aleksandar et al., "Feature Bagging for Outlier Detection," Research Track Paper, pp. 157-166.

Mehrotra, Kishan et al., "Elements of Artificial Neural Networks", MIT Press, pp. 11, 25, 71 76, 85-87, 157, 170-171 (1997).

Miyazaki, Anthony D. et al., "Internet Privacy and Security: An Examination of Online Retailer Disclosures," Journal of Public Policy & Marketing, vol. 19, No. 1, pp. 54-61 (Spring 2000).

Pelleg, Dan et al., "Active Learning for Anomaly and Rare-Category Detection," School of Computer Science, Carnegie-Mellon University, 8 pp.

Tsai, Chieh-Yuan, et al., "A Dynamic Web Service based Data Mining Process System", Proceedings of the 2005 The Fifth International Conference on Computer and Information Technology, pp. 1033-1039 (2005).

West, David et al., "Neural network ensemble strategies for financial decision applications," Computers & Operations Research, 32, pp. 2543-2559 (2005).

Williams, Graham et al., "A Comparative Study of RNN for Outlier Detection in Data Mining," Proceedings of the 2002 IEEE International Conference on Data Mining 12 pp. (2002).

Wong, A.S.Y. et al., "A Unified Sequential Method for PCA", IEEE, pp. 583-586 (1999).

Zhang, Tiezhu et al., "Study on the Application of Dynamic Balanced Scorecard in the Service Industry", 2008 International Conference on Intelligent Computation Technology and Automation, Digital Object Identifier: 10.1109/ICICTA.2008.359, pp. 1158-1162 (2008).

Zhu, Xiaojin, "Semi-Supervised Learning with Graphs," Language Technologies Institute, School of Computer Science, Carnegie Mellon University, Doctoral Thesis, pp. i-x and 1-164 (May 2005).

Credit Technologies, Inc.: News and Press Center, http://www.credit-technologies.com/news_center.asp, 19 pp.

* cited by examiner

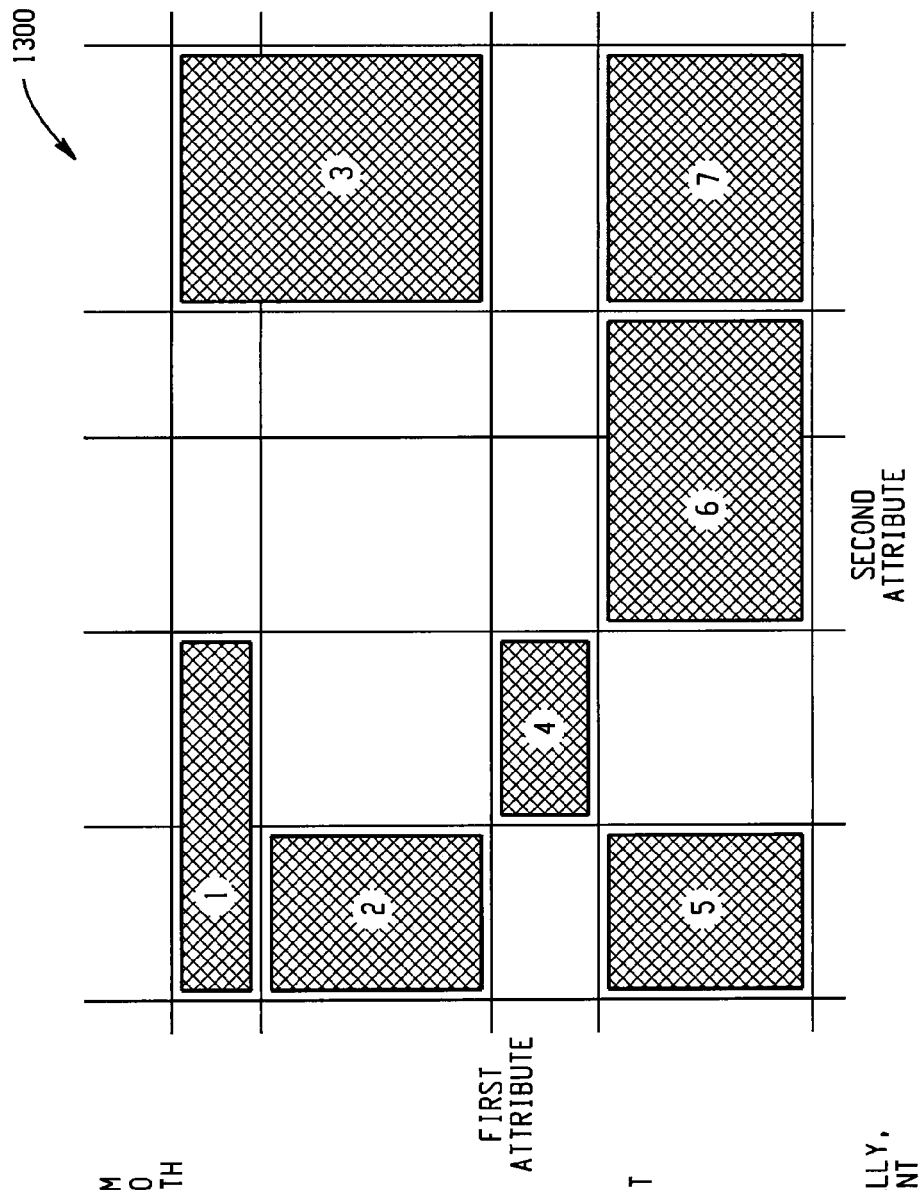

Fig. 13

I: DIVIDE DATA ALONG X AXIS INTO M PIECES

II: SUB DIVIDE EACH OF THE M PIECES ALONG THE Y AXIS INTO N PIECES CREATING A GRID WITH M*N ELEMENTS

III: CHECK THE NUMBER OF SALES IN EACH ELEMENT. IF THE NUMBER IS LESS THAN A MINIMUM THRESHOLD, MERGE IT WITH THE PREVIOUS GRID ELEMENT IN THE SAME ROW. KEEP MERGING WITH PREVIOUS ROW ELEMENTS UNTIL THE MINIMUM THRESHOLD IS SATISFIED.

IV: IF THE GRID ELEMENT IS A CORNER ELEMENT, MERGE IT WITH THE CORNER GRID ELEMENT FROM THE ROW ABOVE. KEEP MERGING WITH THE CORNER ELEMENTS UNTIL THE MINIMUM THRESHOLD IS SATISFIED

7 GRID ELEMENTS. ELEMENTS 1 AND 6 WERE CREATED BY EXTENDING THE ROW HORIZONTALLY, ELEMENT 3 WAS AN EDGE ELEMENT AND EXTENDED VERTICALLY

THE GAPS REPRESENT AREAS WITH NO SALES

| | PARCEL ID | AVAILABLE SALE PRICE | SQ.FT. AREA | LOT SQ.FT. | NUM. BATH | NUM. BED. | XCODE | YCODE | INITIAL GRID NUMBER | FIGURE 13 EQUIVALENT EXPANDED GRID NUMBER | FIGURE 14 EQUIVALENT GRID BORDERS | FIGURE 15 EQUIVALENT GRID USED FOR ESTIMATION | ESTIMATED SALE PRICE |
|---|---|---|---|---|---|---|---|---|---|---|---|---|---|
| 1 | 16734 | 377363 | 3145 | 12579 | 3 | 5 | 5 | 5 | 1 | | | | |
| 2 | 12863 | 282283 | 2352 | 9409 | 1 | 3 | 5 | 5 | 1 | | | | |
| 3 | 15707 | 410474 | 3421 | 13682 | 3 | 5 | 5 | 5 | 1 | | | | |
| 4 | 18373 | 320514 | 2671 | 10684 | 2 | 4 | 5 | 5 | 1 | | | | |
| 5 | 13607 | 304831 | 2540 | 10161 | 2 | 4 | 5 | 5 | 1 | | | | |
| 6 | 19334 | | 2360 | 9440 | 1 | 3 | 5 | 4 | 2 | | | | 283187 |
| 7 | 14505 | | 2013 | 8051 | 1 | 3 | 5 | 4 | 2 | | | | 241523 |
| 8 | 14378 | 218081 | 3217 | 12869 | 3 | 5 | 5 | 4 | 2 | | | | 386077 |
| 9 | 11554 | | 1817 | 7269 | 1 | 2 | 5 | 3 | 2 | | | | |
| 10 | 13328 | 339091 | 2826 | 11303 | 2 | 4 | 5 | 3 | 2 | | | | |
| 11 | 13335 | 233958 | 3188 | 12753 | 3 | 5 | 5 | 3 | 2 | | | | |
| 12 | 13744 | 314352 | 1950 | 7799 | 1 | 2 | 5 | 3 | 2 | 1 | | | 382583 |
| 13 | 14143 | 298604 | 2620 | 10478 | 2 | 4 | 5 | 3 | 2 | 1 | | | |
| 14 | 18753 | 355777 | 2488 | 9953 | 1 | 3 | 5 | 3 | 2 | | | | |
| 15 | 18065 | 250065 | 2965 | 11859 | 2 | 4 | 5 | 2 | 3 | | | | |
| 16 | 11417 | 250065 | 2084 | 8335 | 1 | 3 | 5 | 2 | 3 | | | | |
| 17 | 11908 | | 2672 | 10689 | 2 | 4 | 5 | 2 | 3 | | | | 320658 |
| 18 | 16797 | 244789 | 2040 | 8160 | 1 | 3 | 5 | 2 | 3 | | | | |
| 19 | 19581 | 320277 | 2669 | 10676 | 2 | 4 | 5 | 2 | 3 | | | | |
| 20 | 19222 | 306891 | 2557 | 10230 | 2 | 4 | 5 | 2 | 3 | | | | |
| 21 | 12278 | | 1711 | 6846 | 1 | 2 | 4 | 5 | 4 | | | | 205368 |
| 22 | 19270 | | 2304 | 9218 | 1 | 3 | 4 | 5 | 4 | | | | 276538 |
| 23 | 14654 | | 2743 | 10973 | 2 | 4 | 4 | 4 | | 3 | | | 329197 |
| 24 | 14969 | 354744 | 2056 | 11825 | 2 | 4 | 4 | 4 | | 3 | | | |
| 25 | 17084 | 238082 | 1984 | 7936 | 1 | 2 | 4 | 4 | | 3 | | | |

| | PARCEL ID | AVAILABLE SALE PRICE | SQ.FT. AREA | LOT SQ.FT. | NUM. BATH | NUM. BED. | XCODE | YCODE | INITIAL GRID NUMBER | FIGURE 13 EQUIVALENT EXPANDED GRID NUMBER | FIGURE 14 EQUIVALENT GRID BORDERS | FIGURE 15 EQUIVALENT GRID USED FOR ESTIMATION | ESTIMATED SALE PRICE |
|---|---|---|---|---|---|---|---|---|---|---|---|---|---|
| 26 | 10978 | 384687 | 3206 | 12823 | 3 | 5 | 4 | 4 | 4 | | | | 354382 |
| 27 | 14289 | | 2953 | 11813 | 2 | 4 | 4 | 4 | 4 | | | | 191727 |
| 28 | 11377 | | 1598 | 6391 | 1 | 2 | 4 | 4 | 4 | | | | |
| 29 | 10467 | 367399 | 3062 | 12247 | 3 | 5 | 4 | 4 | 4 | | | | |
| 30 | 10749 | 401684 | 3347 | 13389 | 3 | 5 | 4 | 4 | 4 | | | | |
| 31 | 14446 | 259245 | 2160 | 8642 | 1 | 3 | 4 | 3 | 5 | | | | 294291 |
| 32 | 16641 | 284511 | 2371 | 9484 | 1 | 3 | 4 | 3 | 5 | | | | |
| 33 | 12372 | | 2452 | 9810 | 1 | 3 | 4 | 3 | 5 | | | | |
| 34 | 14529 | 265559 | 2213 | 8852 | 1 | 3 | 4 | 3 | 5 | | | | |
| 35 | 13509 | 379296 | 3161 | 12643 | 3 | 5 | 4 | 3 | 5 | | | | |
| 36 | 13055 | | 2182 | 8729 | 1 | 3 | 4 | 3 | 5 | 6 | | | 261861 |
| 37 | 10294 | | 2727 | 10909 | 2 | 4 | 4 | 2 | 6 | | | | 327277 |
| 38 | 17699 | 313773 | 2615 | 10459 | 2 | 4 | 4 | 1 | 6 | | | | 265504 |
| 39 | 19539 | | 2213 | 8850 | 1 | 3 | 4 | 1 | 6 | | | | 0 |
| 40 | 11595 | 316593 | 2638 | 10553 | 2 | 4 | 4 | 1 | 6 | | | | |
| 41 | 17609 | 286069 | 2384 | 9536 | 1 | 3 | 4 | 1 | 6 | | | | 0 |
| 42 | 14322 | 211941 | 1766 | 7065 | 1 | 2 | 4 | 1 | 6 | | | | 0 |
| 43 | 10201 | 322754 | 2690 | 10758 | 2 | 4 | 3 | 5 | 7 | | | | 0 |
| 44 | 11893 | | 2824 | 11295 | 2 | 4 | 3 | 5 | 7 | | | | 338859 |
| 45 | 19836 | | 2562 | 10246 | 2 | 4 | 3 | 5 | 7 | | | | 307390 |
| 46 | 13016 | | 2725 | 10900 | 2 | 4 | 3 | 5 | 7 | | | | 327007 |
| 47 | 13583 | 425630 | 3547 | 14188 | 4 | 6 | 3 | 5 | 7 | | | | |
| 48 | 15246 | 327631 | 2730 | 10921 | 2 | 4 | 3 | 5 | 7 | | | | |
| 49 | 13558 | 272097 | 2267 | 9070 | 1 | 3 | 3 | 5 | 7 | | | | |
| 50 | 16058 | 277890 | 2316 | 9263 | 1 | 3 | 3 | 5 | 7 | | | | |

*Fig. 17B*

| | PARCEL ID | AVAILABLE SALE PRICE | SQ.FT. AREA | LOT SQ.FT. | NUM. BATH | NUM. BED. | XCODE | YCODE | INITIAL GRID NUMBER | FIGURE 13 EQUIVALENT EXPANDED GRID NUMBER | FIGURE 14 EQUIVALENT GRID BORDERS | FIGURE 15 EQUIVALENT GRID USED FOR ESTIMATION | ESTIMATED SALE PRICE |
|---|---|---|---|---|---|---|---|---|---|---|---|---|---|
| 51 | 11062 | | 1236 | 4943 | 1 | 2 | 3 | 4 | | | | 7 | 148289 |
| 52 | 13384 | | 2174 | 8695 | 1 | 3 | 3 | 4 | | | | 7 | 260854 |
| 53 | 13836 | | 2005 | 8019 | 2 | 3 | 3 | 4 | | | | 7 | 240575 |
| 54 | 16709 | | 2793 | 11171 | 1 | 4 | 3 | 4 | | | | 7 | 335121 |
| 55 | 17379 | | 1859 | 7438 | 1 | 2 | 3 | 3 | | | | 7 | 223132 |
| 56 | 19494 | | 1206 | 4822 | 1 | 2 | 3 | 3 | | | | 7 | 144672 |
| 57 | 15391 | | 2347 | 9388 | 1 | 3 | 3 | 2 | | | | 7 | 281629 |
| 58 | 19778 | | 2564 | 10255 | 2 | 4 | 3 | 2 | | | | 7 | 307636 |
| 59 | 10809 | | 3389 | 13557 | 3 | 5 | 3 | 1 | | | | 7 | 406707 |
| 60 | 10986 | | 3470 | 13881 | 3 | 5 | 3 | 1 | | | | 7 | 416427 |
| 61 | 12067 | | 2648 | 10593 | 2 | 4 | 3 | 1 | | | | 7 | 317777 |
| 62 | 12933 | | 2485 | 9939 | 1 | 3 | 3 | 1 | | | | 7 | 298160 |
| 63 | 11752 | | 1956 | 7822 | 1 | 2 | 2 | 5 | | | | 7 | 234664 |
| 64 | 11184 | | 1565 | 6260 | 1 | 2 | 2 | 5 | | | | 7 | 187788 |
| 65 | 16550 | | 1819 | 7275 | 1 | 2 | 2 | 4 | | | | 8 | 218264 |
| 66 | 18555 | | 3176 | 12704 | 3 | 5 | 2 | 4 | | | | 8 | 381110 |
| 67 | 13240 | | 2564 | 10257 | 2 | 4 | 2 | 4 | | | | 8 | 307698 |
| 68 | 13201 | | 3361 | 13445 | 3 | 5 | 2 | 3 | | | | 8 | 403348 |
| 69 | 16528 | | 1727 | 6909 | 1 | 2 | 2 | 3 | | | | 8 | 207281 |
| 70 | 18279 | | 2977 | 11907 | 2 | 4 | 2 | 3 | | | | 8 | 357214 |
| 71 | 12341 | | 3886 | 15545 | 4 | 6 | 2 | 2 | 8 | | | | |
| 72 | 14708 | 341336 | 2844 | 11378 | 2 | 4 | 2 | 1 | 8 | | | 8 | 466340 |
| 73 | 16274 | | 2612 | 10450 | 2 | 4 | 2 | 1 | 8 | | | | |
| 74 | 14270 | | 2687 | 10746 | 2 | 4 | 2 | 1 | 8 | | | 8 | 313500 |
| 75 | 18723 | 366257 | 3052 | 12209 | 3 | 5 | 2 | 1 | | | | 8 | 322382 |

Fig. 17C

| | PARCEL ID | AVAILABLE SALE PRICE | SQ.FT. AREA | LOT SQ.FT. | NUM. BATH | NUM. BED. | XCODE | YCODE | INITIAL GRID NUMBER | FIGURE 13 EQUIVALENT EXPANDED GRID NUMBER | FIGURE 14 EQUIVALENT GRID BORDERS | FIGURE 15 EQUIVALENT GRID USED FOR ESTIMATION | ESTIMATED SALE PRICE |
|---|---|---|---|---|---|---|---|---|---|---|---|---|---|
| 76 | 15891 | | 2417 | 9668 | 1 | 3 | 2 | 1 | 8 | | | | 290044 |
| 77 | 10699 | 323010 | 2692 | 10767 | 2 | 4 | 2 | 5 | 8 | | | | |
| 78 | 17557 | 379245 | 3160 | 12642 | 3 | 5 | 1 | 5 | 9 | | | | |
| 79 | 17161 | | 2344 | 9376 | 1 | 3 | 1 | 5 | 9 | | | | 281267 |
| 80 | 16015 | | 3096 | 12382 | 3 | 5 | 1 | 5 | 9 | | | | 371470 |
| 81 | 10862 | 249471 | 2079 | 8316 | 1 | 3 | 1 | 5 | 9 | | | | |
| 82 | 18950 | | 3720 | 14882 | 4 | 6 | 1 | 5 | 9 | | | | 446458 |
| 83 | 16852 | 424495 | 3537 | 14150 | 4 | 6 | 1 | 5 | 9 | | | | |
| 84 | 18184 | 342603 | 2855 | 11420 | 2 | 4 | 1 | 4 | 10 | | | | |
| 85 | 19299 | | 1798 | 7190 | 1 | 2 | 1 | 4 | 10 | | | | 215703 |
| 86 | 17001 | 321316 | 2678 | 10711 | 2 | 4 | 1 | 4 | 10 | | | | |
| 87 | 14271 | 372165 | 3101 | 12406 | 3 | 5 | 1 | 4 | 10 | | | | |
| 88 | 16271 | | 2500 | 10002 | 2 | 4 | 1 | 4 | 10 | | | | 300052 |
| 89 | 17518 | | 2673 | 10694 | 2 | 4 | 1 | 4 | 10 | | | | 320809 |
| 90 | 11364 | 320548 | 2671 | 10685 | 2 | 2 | 1 | 3 | | | | | |
| 91 | 14681 | | 2084 | 8336 | 1 | 3 | 1 | 3 | | | | | 250068 |
| 92 | 14068 | | 1845 | 7379 | 1 | 2 | 1 | 2 | | | | | 221367 |
| 93 | 17368 | | 2283 | 9133 | 1 | 3 | 1 | 2 | | | | | 273997 |
| 94 | 12229 | | 3194 | 12776 | 3 | 5 | 1 | 2 | | | | | 383280 |
| 95 | 12801 | | 2883 | 11533 | 2 | 4 | 1 | 2 | | | | | 346001 |
| 96 | 10185 | 212294 | 1769 | 7076 | 1 | 2 | 1 | 1 | 11 | | = | | |
| 97 | 12408 | 284246 | 2369 | 9475 | 1 | 3 | 1 | 1 | 11 | | = | | |
| 98 | 17471 | 333841 | 2782 | 11128 | 2 | 4 | 1 | 1 | 11 | | = | | |
| 99 | 15616 | | 2077 | 8308 | 1 | 3 | 1 | 1 | 11 | | = | | 249253 |
| 100 | 13830 | 279493 | 2329 | 9316 | 1 | 3 | 1 | 1 | | | | | |

COMPUTER-IMPLEMENTED SYSTEMS AND METHODS FOR FORECASTING AND ESTIMATION USING GRID REGRESSION

TECHNICAL FIELD

This document relates generally to computer-implemented forecasting and estimation and more particularly to grid generated forecasting and estimation.

BACKGROUND

Forecasting is a process of making statements about events whose actual outcomes typically have not yet been observed. A commonplace example might be forecasting some variable of interest at some specified future date. Forecasting often involves formal statistical methods employing time series, cross-sectional or longitudinal data, or alternatively to less formal judgmental methods. Forecasts are often generated by providing a number of input values to a predictive model, where the model outputs a forecast. For example, a predictive model may consider a number of inputs including pricing, seasonality, marketing efforts, and other inputs in forecasting demand for a product.

Similarly, a model may be used to generate an estimate of a value based on a number of input values. For example, a property value for a real estate property may be estimated based on a lot size, availability of mortgages, nearby foreclosures, number of bedrooms, a local economy metric, a national economy metric, values of surrounding properties, an interest rate, as well as other inputs.

SUMMARY

In accordance with the teachings herein, systems and methods are provided for estimating a value for a target variable. A plurality of known entities are assigned to cells of a grid, where the known entities are assigned to the cells based upon attribute data. A determination is made as to whether each cell has at least a threshold number of assigned known entities. When one of the cells contains fewer than the threshold number of known entities, cells are combined to form a super cell. A model is generated for each cell and super cell based upon target variable values for known entities assigned to that cell or super cell. Data for a target entity is received, and the target entity is assigned to one of the cells. One of the models is selected based upon the cell assignment, and an estimate is generated for the target variable for the target entity using the selected model.

As another example, a system for estimating a value for a target variable may include one or more data processors and one or more computer-readable mediums that include instructions for commanding the one or more data processors to execute steps. In the steps, a plurality of known entities are assigned to cells of a grid, where the known entities are assigned to the cells based upon attribute data. A determination is made as to whether each cell has at least a threshold number of assigned known entities. When one of the cells contains fewer than the threshold number of known entities, cells are combined to form a super cell. A model is generated for each cell and super cell based upon target variable values for known entities assigned to that cell or super cell. Data for a target entity is received, and the target entity is assigned to one of the cells. One of the models is selected based upon the cell assignment, and an estimate is generated for the target variable for the target entity using the selected model.

As a further example, a computer-readable medium may be encoded with instructions for commanding one or more data processors to execute a method for estimating a value for a target variable. In the method, plurality of known entities are assigned to cells of a grid, where the known entities are assigned to the cells based upon attribute data. A determination is made as to whether each cell has at least a threshold number of assigned known entities. When one of the cells contains fewer than the threshold number of known entities, cells are combined to form a super cell. A model is generated for each cell and super cell based upon target variable values for known entities assigned to that cell or super cell. Data for a target entity is received, and the target entity is assigned to one of the cells. One of the models is selected based upon the cell assignment, and an estimate is generated for the target variable for the target entity using the selected model.

BRIEF DESCRIPTION OF THE FIGURES

FIGS. 12-15 depict an example target value scoring operation for target entities.

FIGS. 17A and 17B depict a numeric example for estimating property values.

DETAILED DESCRIPTION

Figure 1:
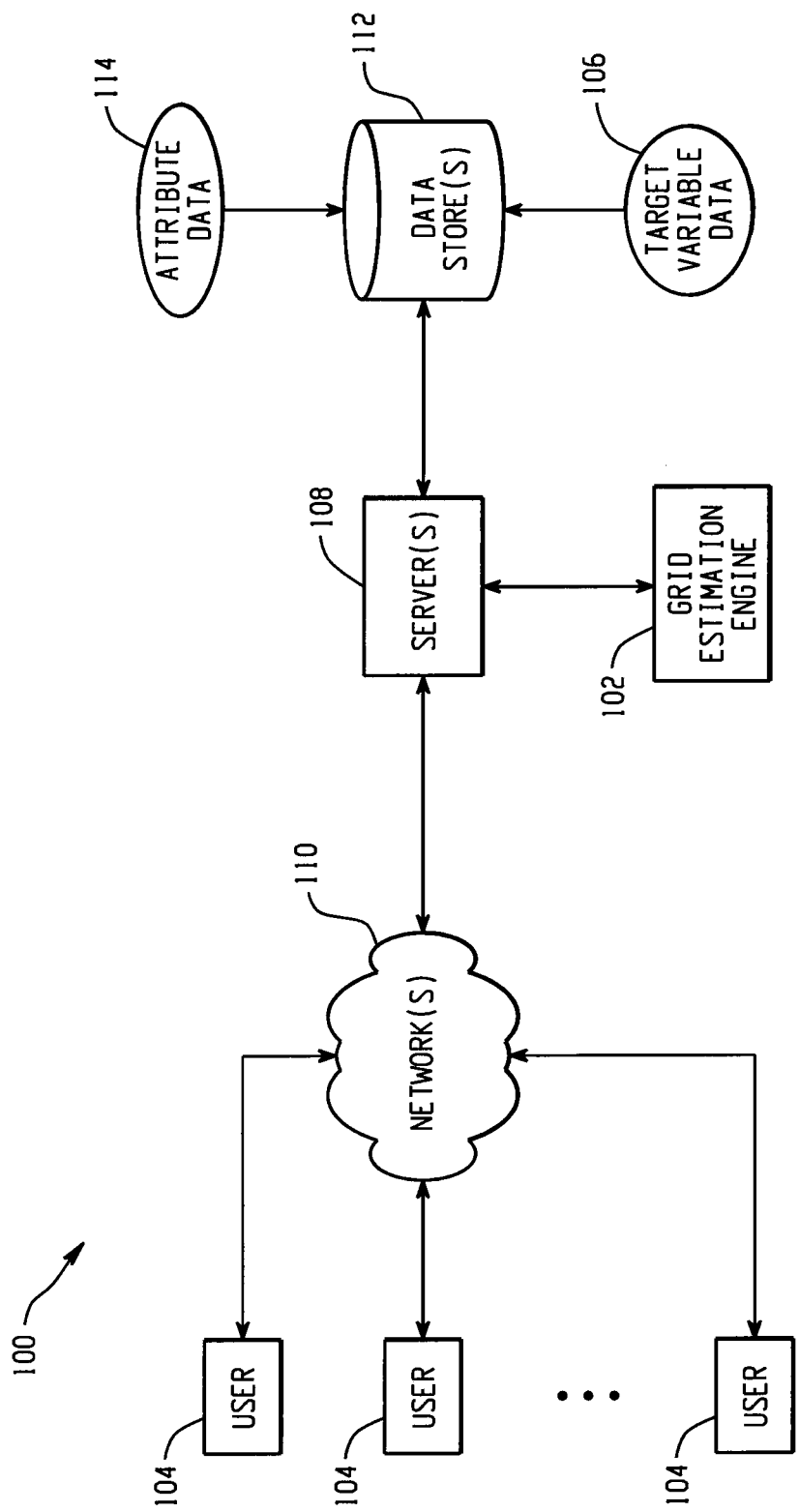
FIG. 1 is a block diagram depicting a computer-implemented grid regression engine.

FIG. 1 is a block diagram depicting a computer-implemented grid estimation engine. The grid estimation engine 102 facilitates the estimation of a value for a target variable using a model. A model (e.g., a regression model, an artificial neural network model, a general regression neural network model) may be trained by processing known pairs of one or more input variable values and known target variable values. The model determines relationships between the training input variable values and the known target variable values and uses those determined relationships to estimate target variable values for future inputs, where the input variable values are known and target variable value estimates are sought. When the estimate is for a future value of the target variable, the estimate is a forecast.

Models for providing estimates often have a range of best performance, wherein when the input variable values are within the range of best performance, the model can be relied upon to provide high quality estimations of the target variable value. For example, in an implementation where the model is trained to estimate property values for properties within a city, the model may do a good job of estimating values for mid-value properties but may struggle to provide accurate estimates for high-value and low-value properties. To counter this effect, it may be desirable to provide multiple models for providing estimates, such as a model for estimating high-value property values, a model for estimating mid-value property values, and a model for estimating low-value property values. The incorporation of more models into the estimating process (e.g., a high-to-mid-value estimating model) may further improve performance.

The benefits of continued granularization of the models may be counterbalanced by a limited amount of known data available for training the models. The quality of a model may be largely impacted by the amount of known data provided to the model for training. Thus, where the models are over-granularized, performance of the data estimation system may break down, such that the use of fewer models will offer better performance.

The grid estimation engine 102 offers a tool for balancing the benefits of using multiple models to perform estimation with the loss in performance caused by under training models based on a lack of known data. Known entities having known values for input attributes of the entity as well as known values for the target variable for the known entity are divided amongst cells of a one-or-more dimension grid, where models are generated for different cells of the grid by training those models based upon the known entities that are assigned to the cells. When certain cells do not have enough known entities to perform a quality model training, those certain cells may be combined with other cells having known entities to form a super cell. A model is then generated for the super cell using the combined set of known entities so that the super cell model is sufficiently trained.

When a target entity is encountered, where input attribute values are known for the target entity, and an estimate for the target value for the target entity is sought, the target entity is assigned to one of the grid cells. The model generated for the cell or super cell associated with the assigned target entity cell is then used to generate an estimate for the target variable for the target entity.

The grid estimation engine 102 provides a platform for users 104 to generate estimates for a value for a target variable 106. A user 104 accesses the grid estimation engine 102, which is hosted on one or more servers 108, via one or more networks 110. The one or more servers 108 are responsive to one or more data stores 112. The one or more data stores 112 may contain a variety of data that includes input attribute data 114 and target variable data 106.

Figure 2:
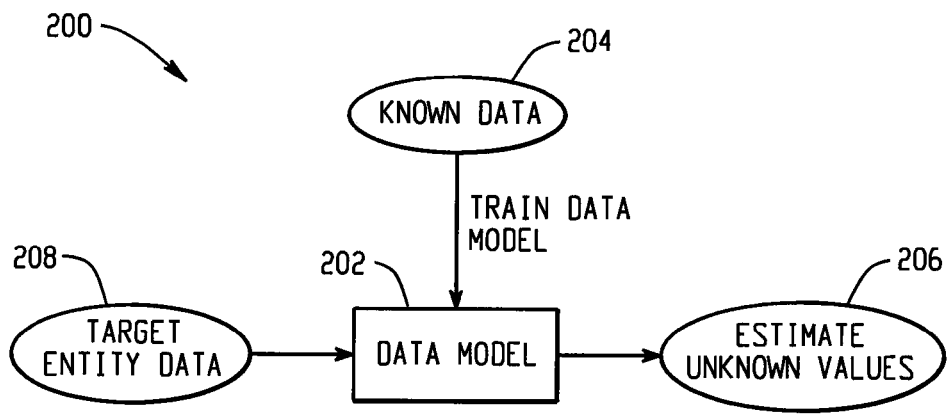
FIG. 2 is a block diagram depicting estimation of unknown values using a data model.

FIG. 2 is a block diagram depicting estimation of unknown values using a data model. A data model 202 (e.g., a regression model, an artificial neural network model, a general regression neural network model) is trained using known data, such as data that includes values for input attribute variables as well as data for one or more target variables. The data model 202 determines relationships between the input attribute values and the known target variable values in the known data 204. After training, those determined relationships are used for estimating unknown target variable values 206. The data model 202 receives data 208 for target entities, where that data 208 includes values for input attributes but lacks values for the target variables. The data model uses the input attribute values to generate estimates 206 for the unknown target variable values based on the prior training.

Figure 3:
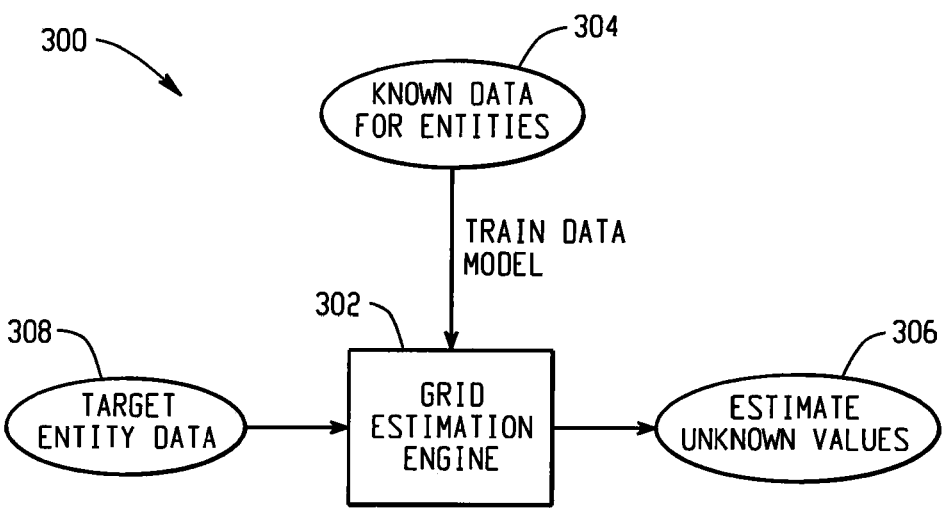
FIG. 3 is a block diagram depicting estimation of unknown values using a grid estimation engine.

FIG. 3 is a block diagram depicting estimation of unknown values using a grid estimation engine. At a high level of abstraction, the grid estimation engine 302 functions in a similar manner as the single data model example of FIG. 2. Models of the grid estimation engine 302 are trained using known entities 304 having known values for input attributes as well as target variables. The trained data models of the grid estimation engine 302 are then used to estimate unknown target variable values 306 for received target entities, where the received target entity data 308 lacks data values for the target variable.

Figure 4:
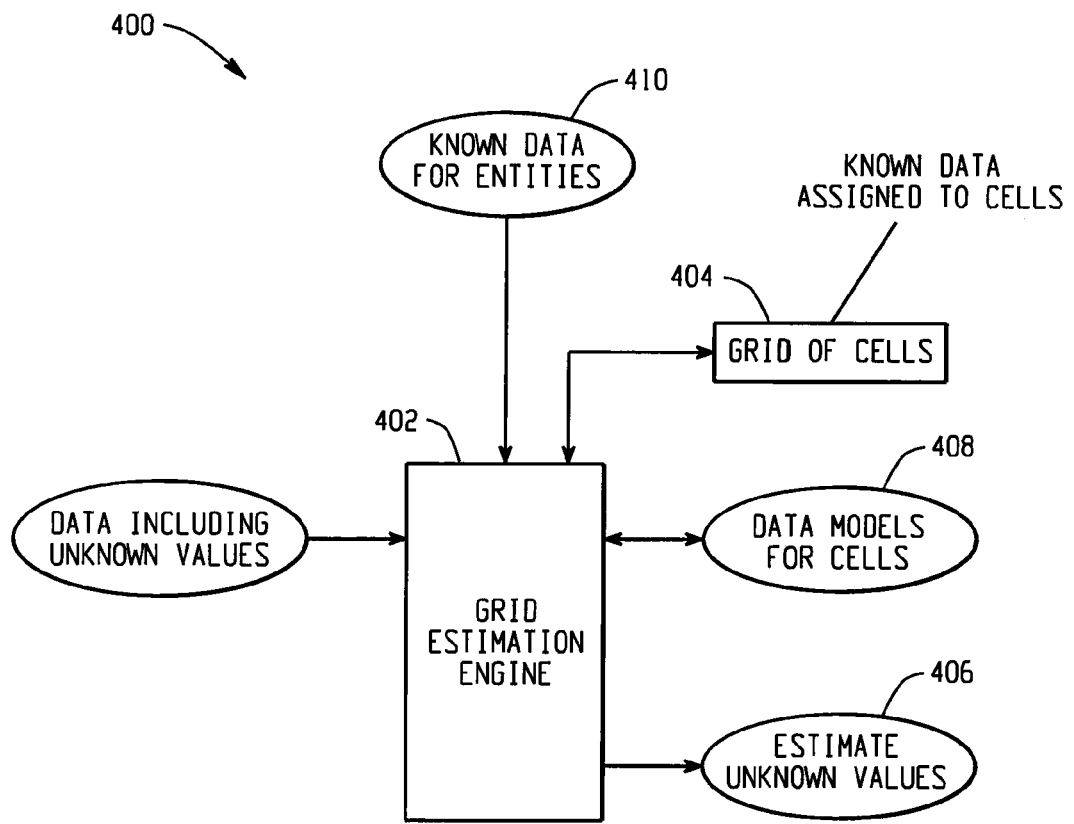
FIG. 4 is a block diagram depicting generation of data models for cells by a grid estimation engine.

FIG. 4 is a block diagram depicting generation of data models for cells by a grid estimation engine. As described above, in some situations, the relationship between the input and output variables is not linear. For example, in spatial models, the space variables such latitude and longitude play a special role compared to other input variables such as size and age of residence in estimating the price of a residence. As another example, in score fusion models, scores such as credit risk and bankruptcy risk scores, or application fraud and transaction fraud scores play a special role compared to other input variables such as income or transaction amount or transaction time in predicting the overall riskiness of an account or transaction.

Grid estimation recognizes this special relationship between some input variables and the output variables and exploits it to create models that are accurate and robust. Specifically, the grid estimation engine 402 uses these special variables to create an intelligent grid of cells 404, and then uses the rest of the input variables to predict or estimate values for the output target variables by building a model 408 for each cell in the grid 404. The model 408 created for each cell 408 can be a simple model, such as a simple or weighted average, or a simple or multiple regression, or a more complex model, such as an artificial neural network. The models 408 for the cells may be of uniform type or disparate type across the different cells.

Let the special variables be $s_{ik}$ i=1, ... L, k=1, ... N, where L defines the small number of special input variables and N defines the number of observations. Let $x_{jk}$ j=1, ... M represent the remaining M input variables and $y_k$ represent the output variable. It is possible that only a small number of the N observations have a known output value. Let $O \leq N$ represent the number of observations with a known output value. If $D_i$ represents the number of groups in dimension i, then the grid will have $\Pi D_i$ elements.

The grid regression engine 402 begins by taking the O observations with known output values 410 and dividing them into an L dimensional grid 404 such that the observations are distributed among each element of the grid as evenly as possible. For example, if the special variables are latitude and longitude (L=2) with the output variable being home prices, O=10,000 home sales in the past year, the latitude may be divided into six groups, and the longitude may be divided into ten groups so that the grid estimation engine 402 generates a two-dimensional grid having 60 cells.

Figure 5:
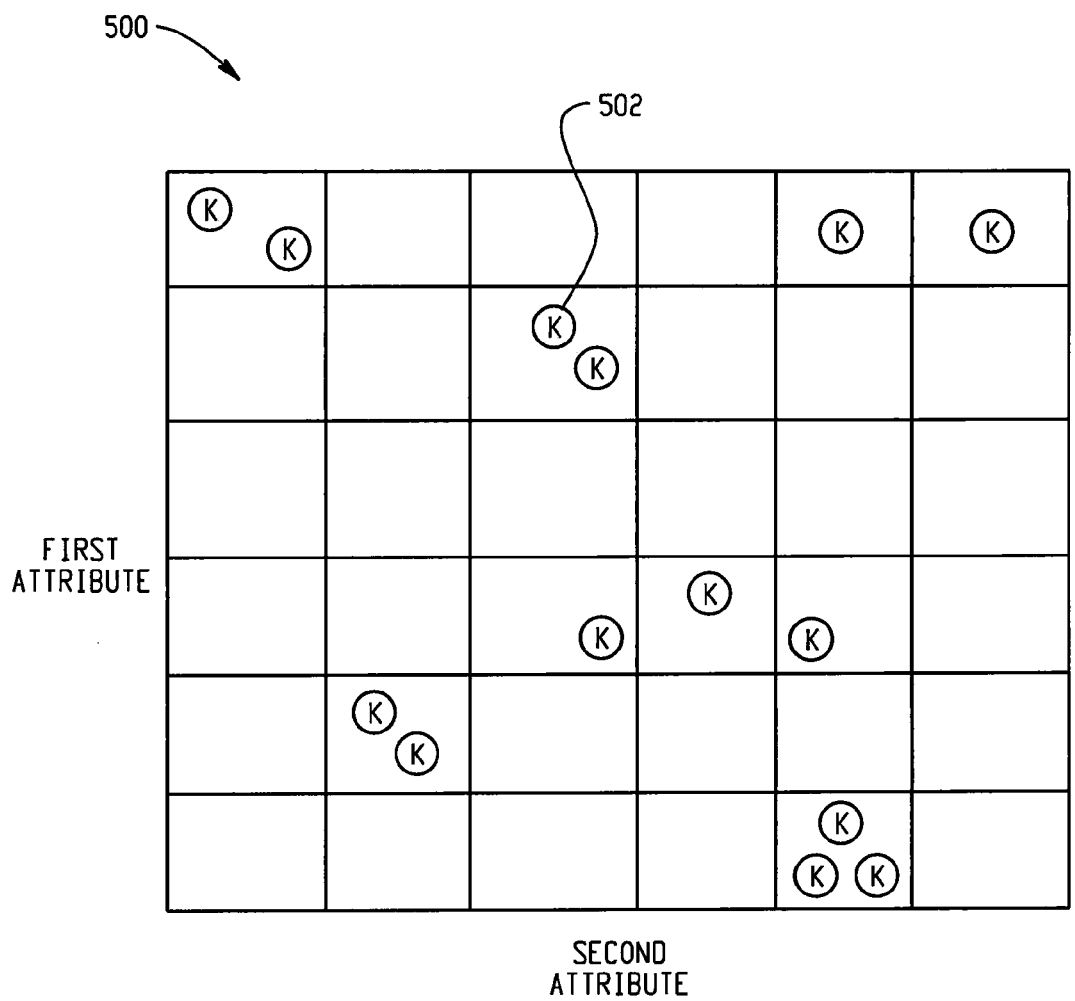
FIG. 5 is a diagram depicting a grid where known entities are assigned to cells of the grid based on attribute values.

FIG. 5 is a diagram depicting a grid where known entities are assigned to cells of the grid based on attribute values. The grid is delineated along the y-axis according to first attribute values and along the x-axis by second attribute values. Known entities 502 (i.e., entities for which a target variable value is known) are assigned to cells of the grid 500. Each cell of the grid is associated with a single value or range of values for each of the first attribute and the second attribute (e.g., a latitude range and a longitude range). The cells may be defined according to uniform delineations or the grid cells may be unevenly spaced. In some implementations, the grid cells may be delineated so as to effect a uniform distribution of the known entities among the grid cells.

Figure 6:
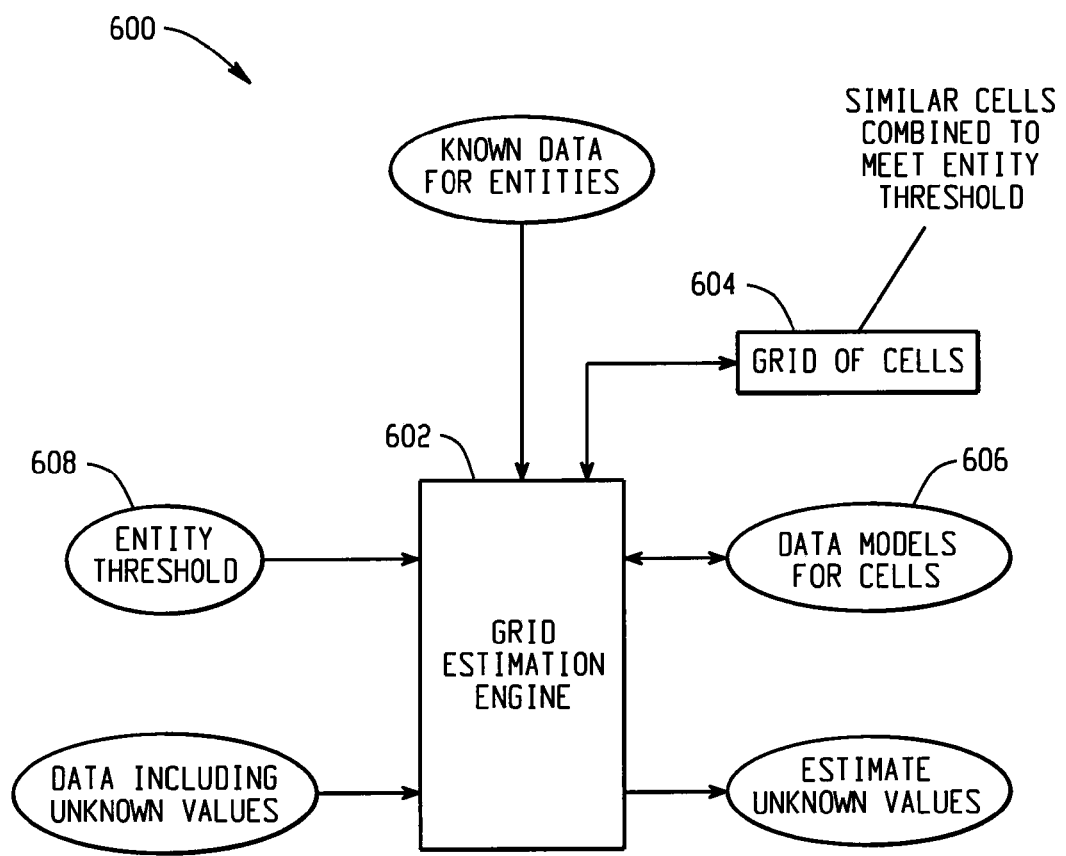
FIG. 6 is a block diagram depicting combining cells by a grid estimation engine.

FIG. 6 is a block diagram depicting combining cells by a grid estimation engine. A grid estimation engine 602 examines each cell of the grid 604 to determine whether each cell has a sufficient number of observations for training a model 606. Cells having an insufficient number of known entities (e.g., cells having less than a threshold number 608 of known entities) may be combined with neighboring grid cells, with priority given to cells that are most similar to the grid cell being eliminated. There might be cells in the L dimensional space that might not be assigned to any model associated cell.

Figure 7:
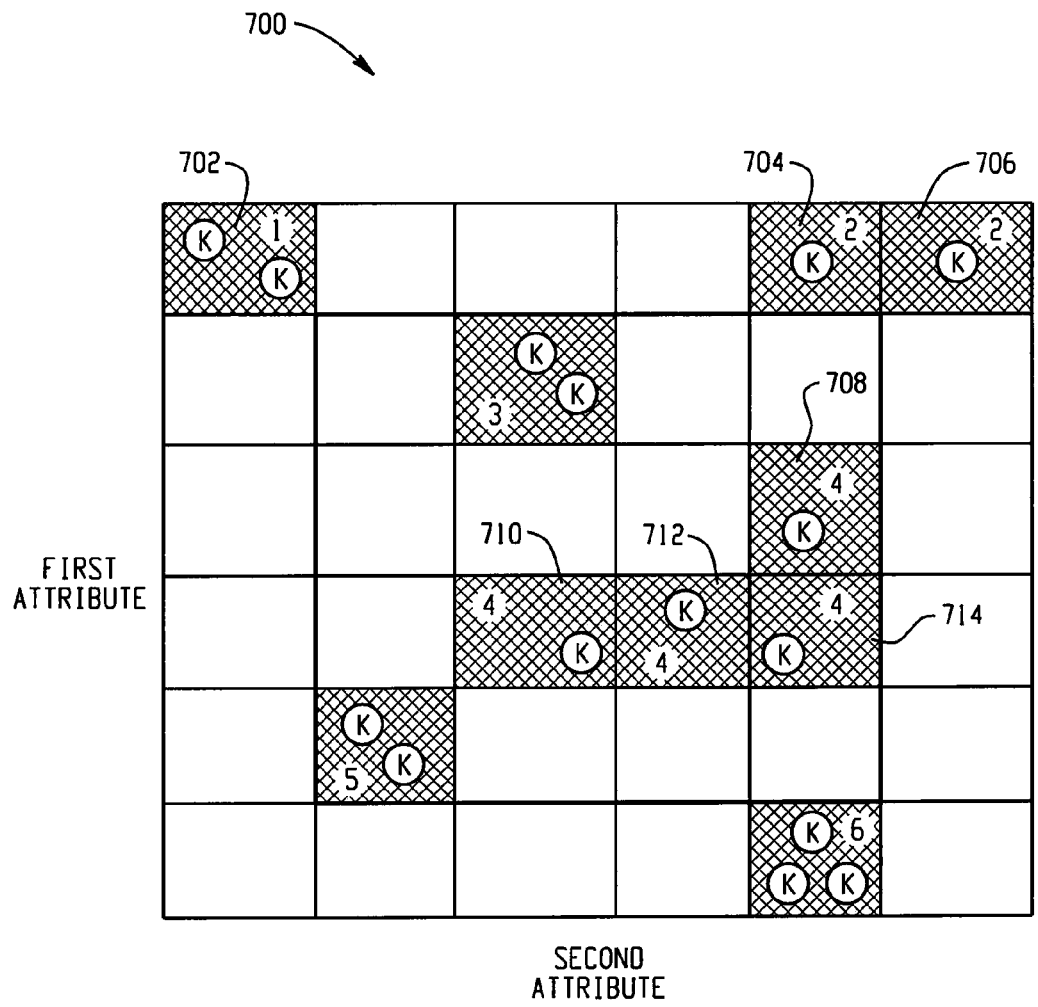
FIG. 7 is a diagram depicting the combination of grid cells when a cell does not have sufficient known entities for training a model.

FIG. 7 is a diagram depicting the combination of grid cells when a cell does not have sufficient known entities for training a model. In the example of FIG. 7, there are several cells having no assigned known entities. Cell 702 is determined to have sufficient known entities for training a model. Cells 704, 706 are determined to not have sufficient known entities and are combined to form super cell 2. Similarly, cells 708, 710, 712, 714 are combined to form super cell 4 based on their having fewer than a sufficient number of known entities for training a model. A grid estimation engine can use one or more methods for determining cells to combine. For example, cells lacking sufficient known entities may be combined based on an algorithm that combines cells in a left-to-right, right-to-left, top-to-bottom, or bottom-to-top methodology. Alternatively, the grid estimation engine may combine cells based on a more complicated process, such as one that compares input and target variables of known entities assigned to adjacent cells to combine the most similar cells.

Figure 8:
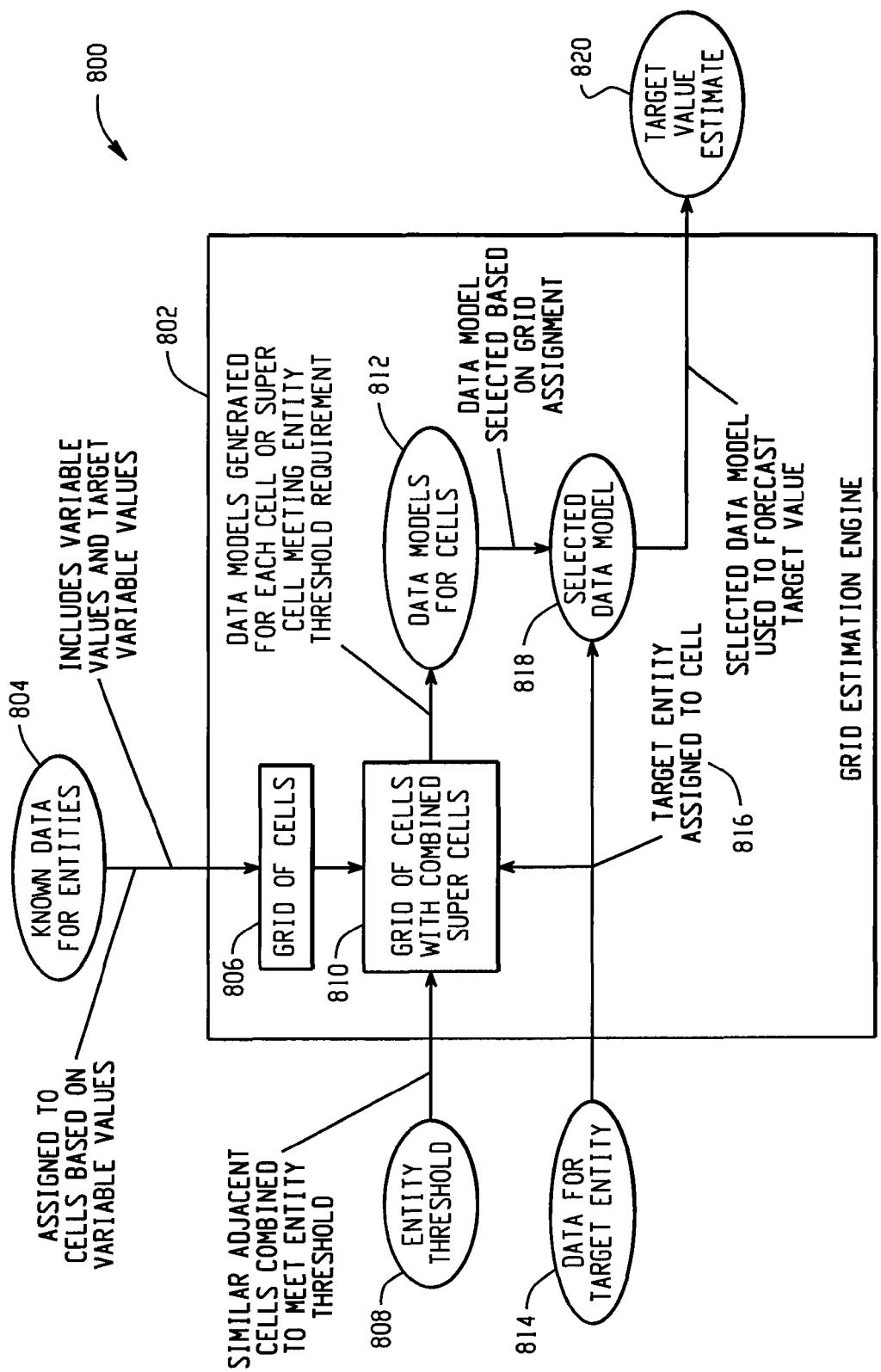
FIG. 8 is a block diagram depicting the generation of models for cells or groups of cells.

Once the grid has been created, the grid estimation engine proceeds to build models for each grid cell or super cell having assigned known entities. Models can be simple or weighted average models or the models may be more complex models such as simple or multiple regression models or neural networks. FIG. 8 is a block diagram depicting the generation of models for cells or groups of cells (i.e., super cells). A grid estimation engine 802 receives a number of known entities 804 having input attribute data as well as known values for a target variable. The known entities 804 are assigned to cells of a grid 806 based on the input attribute values (e.g., a first attribute value and a second attribute value). The grid estimation engine 802 receives an entity threshold 808 that identifies a minimum number of known entities 804 that must be in a grid cell to sufficiently train a model. The grid estimation engine 802 examines the cells and their assigned known entities 804 to determine whether each cell has at least the threshold 808 number of known entities 804. Cells of the grid 806 having at least one assigned known entity 804 but less than the threshold 808 number of assigned known entities 804 may be combined to form super cells. The grid 806 is thus modified to comprise a grid of cells with certain cells being combined into super cells, as indicated at 810. A data model is generated at 812 for each cell or super cell in the grid 810 that has at least one assigned known entity.

When the data models 812 have been generated, the grid estimation engine 802 is ready for estimating a target value for a target entity. Data for the target entity is received at 814. The received data 814 includes data for the input attribute variables used to define the grid. Using the attribute values for the target entity, the target entity is assigned to a cell at 816. Based on the cell assignment 816, one or more of the generated models 812 are selected at 818, and the one or more selected models are used to estimate the target value 820 for the target entity.

Figure 9:
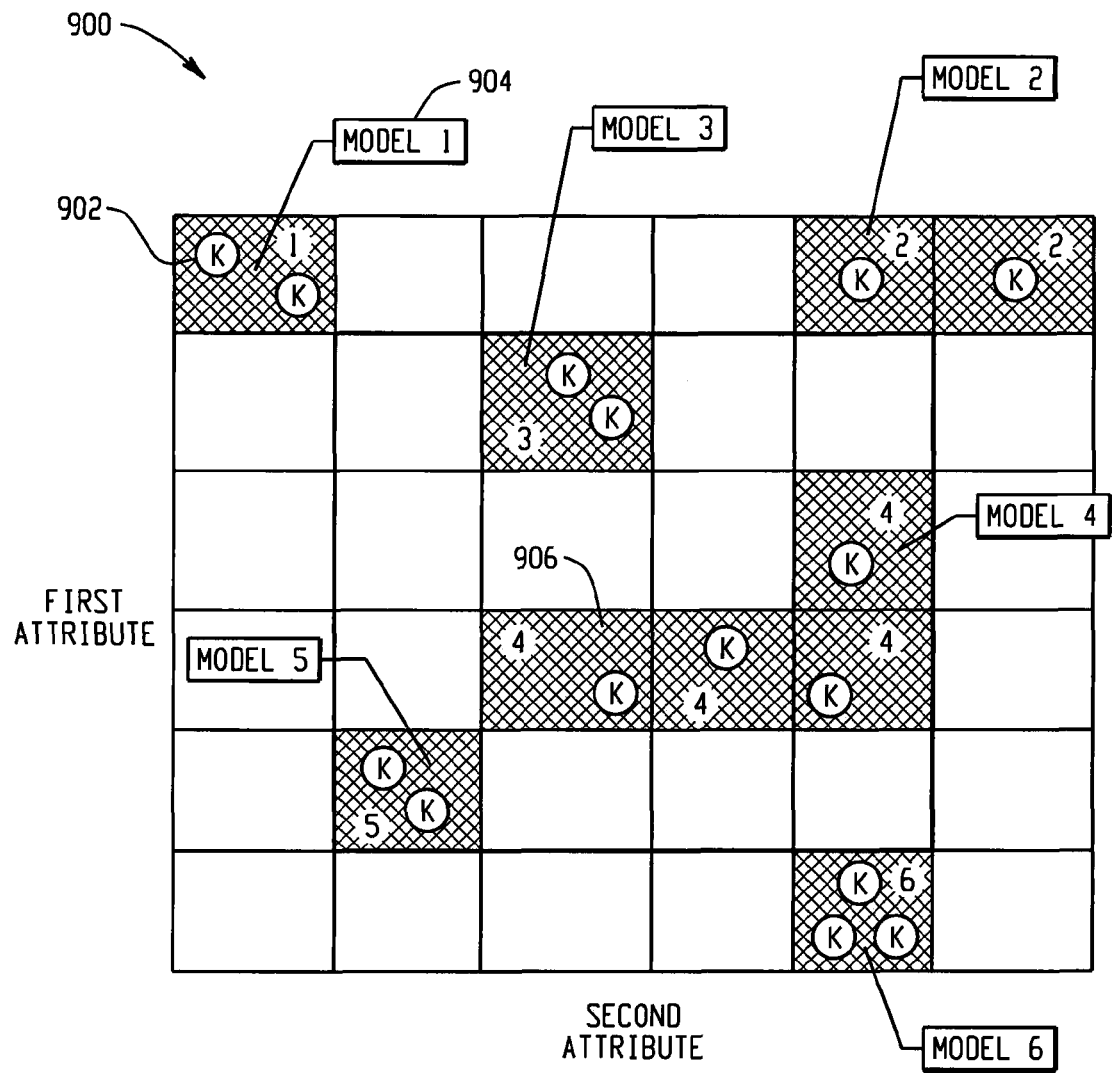
FIG. 9 is a diagram depicting generation of models for cells and super cells of the grid.

FIG. 9 is a diagram depicting generation of models for cells and super cells of the grid. Each of the six cells and super cells of the grid 900 that contain known entities 904 has a model 904 generated and associated that cell or super cell. The generated models 904 are trained using variable data for the known entities 902 within the associated cell or super cell. By combining cells to form super cells, such as super cell group 4 906, a sufficient number of known entities 902 are present in each cell or super cell so that the associated model 904 has sufficient data for training.

Figure 10:
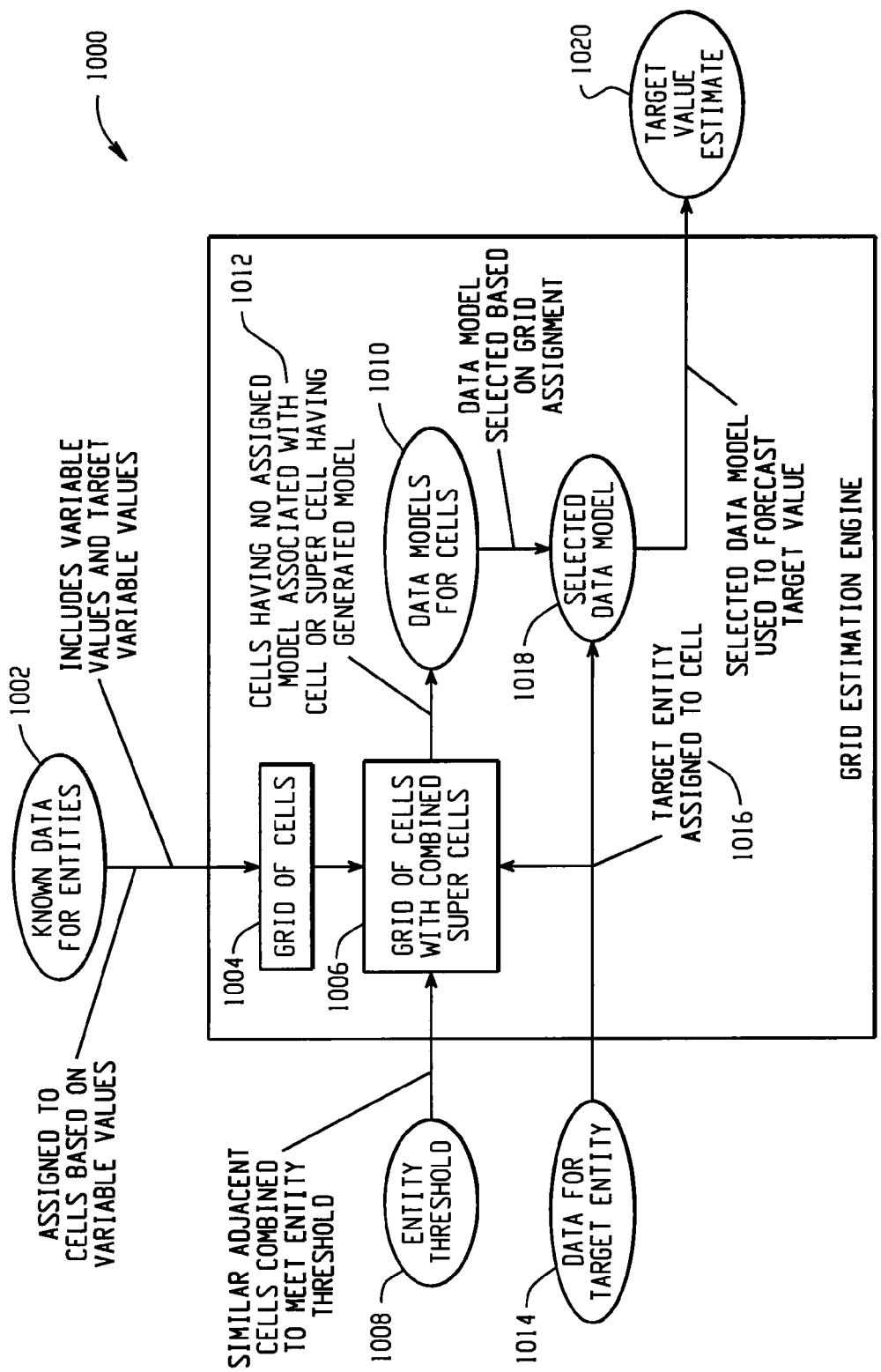
FIG. 10 is a block diagram depicting the expansion of cell and super cell borders to cover cells that are not associated with a model.

FIG. 10 is a block diagram depicting the expansion of cell and super cell borders to cover cells that are not associated with a model. The grid estimation engine assigns empty cells to cell groups having associated models. Cell borders can be extended by assigning the minimum value of the adjacent cell as the maximum border value of the preceding cell. Cell extension can also include assigning a cell lacking an associated model to multiple other cells that have associated models. Note that this assignment process can still leave some empty cells that are be assigned to any model associated cells.

In FIG. 10, data associated with a plurality of known entities is received at 1002, where the data includes values for a first attribute, a second attribute, and a target variable. At 1004, the known entities are assigned to cells of a grid, where each cell is associated with a value for the first attribute and a value for the second attribute, where the known entities are assigned to the cells based upon the first attribute data and the second attribute data 1002. At 1006, a determination is made as to whether each cell has at least a threshold number 1008 of assigned known entities. Cells are combined to form a super cell when one of the cells contains fewer than the threshold number 1008 of known entities. At 1010, a model is generated for each cell and super cell having assigned known entities 1002, where the model is generated based upon the target variable values for the known entities 1002 assigned to that cell or super cell. As indicated at 1012, cells having no assigned known entities are associated with a cell or super cell having an associated generated model.

At 1014, data for a target entity is received, where the data for the target entity includes target entity values for the first attribute and the second attribute. At 1016, the target entity is assigned to one of the cells, where the target entity is assigned based upon the target entity values for the first attribute and the second attribute. Based upon the cell assignment, at 1018 one or more of the models are selected, and the one or more selected models are used at 1020 to generate an estimate for the target variable for the target entity.

Figure 11:
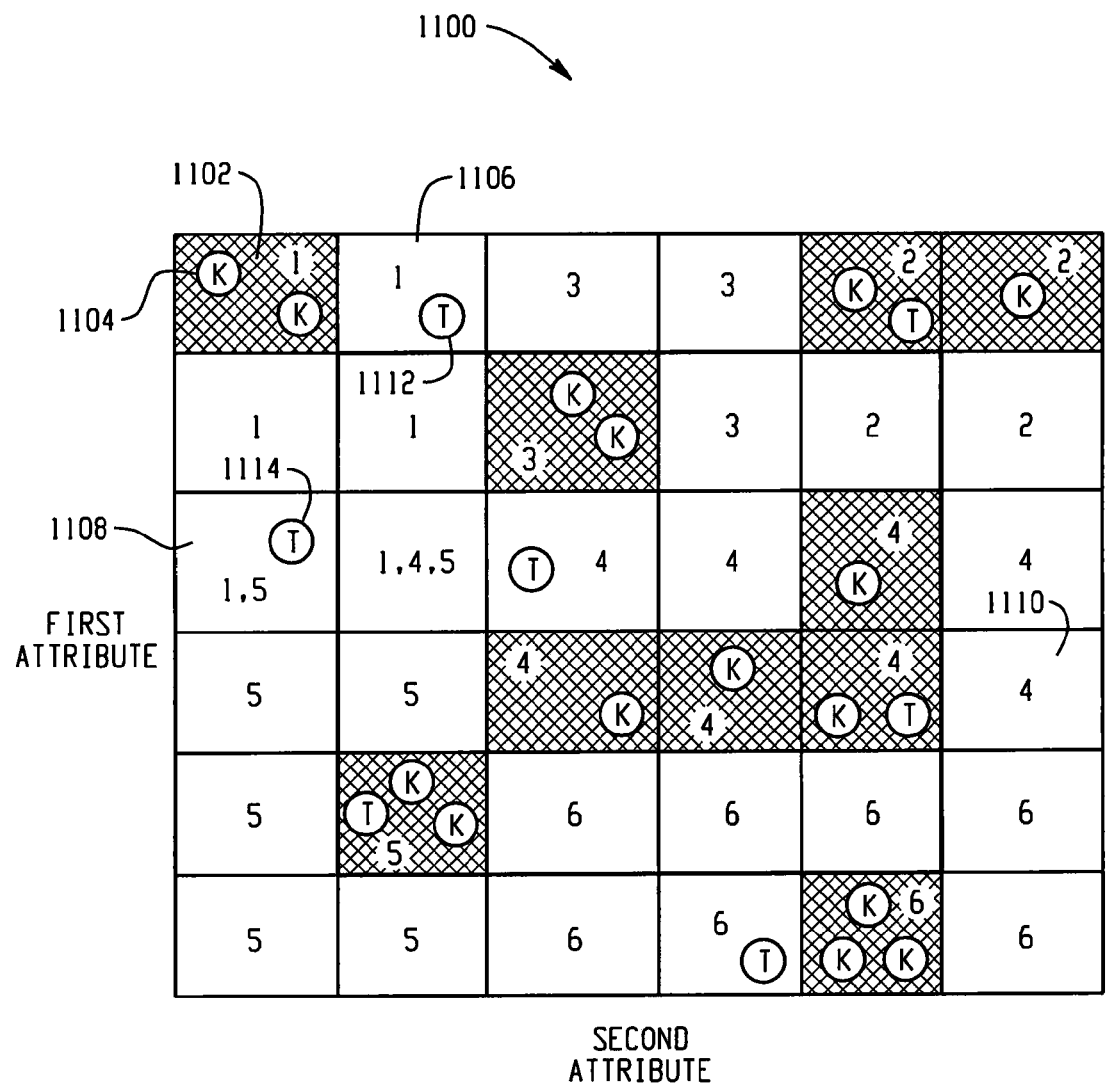
FIG. 11 is a diagram depicting associations of cells having no assigned known entities with cells or super cells having associated generated models.

FIG. 11 is a diagram depicting associations of cells having no assigned known entities with cells or super cells having associated generated models. The cells 1102 of the grid 1100 having assigned known entities 1104 have been grouped (i.e., groups 1-6) and have had models generated for those groups. The cells that do not have assigned known entities (e.g., cells 1106, 1108, 1110) are associated with one or more of the cell groups that have associated generated models. For example, cell 1106 is associated with group 1, cell 1108 is associated with groups 1 and 5, and cell 1110 is associated with group 4.

Target entities can be scored based upon the cell to which they are assigned. Target entities having unknown output values that are assigned to a cell within the borders of model associated cells or super cells are estimated using the models developed for that cell or super cell. Target entities assigned to cells outside the borders of model associated cells or super cells may be assigned a model using missing value imputation techniques, where the target entity cell is assumed to be a missing element that is imputed using the special variables $s_{ik}$ and other variables $x_{jk}$. Once the target variables are estimated using the models, they may be capped using statistics from the assigned cell or some or all neighboring cells to ensure that the errors of cell assignment are minimized towards contribution to producing outliers.

For example, the first attribute value and the second attribute value for target entity 1112 are examined, and the target entity 1112 is assigned to cell 1106. Based on the assignment to cell 1106, the model associated with the group 1 cells is used to estimate the target value for the target entity 1112. The first attribute value, the second attribute value, and/or other variable values for the target entity 1112 are input into the model to estimate the target value.

As another example, the target entity 1114 in cell 1108 has its target value estimated using the models associated with group 1 and group 5. For example, the first attribute value, the second attribute value, and/or other variable values for the target entity 1114 may be individually input into the group 1 and group 5 models, where each of the models generate an independent estimate of the target value for target entity 1114. Those estimates can then be combined, such as via averaging or other method to generate a final estimate for the target value for target entity 1114.

Figure 12:
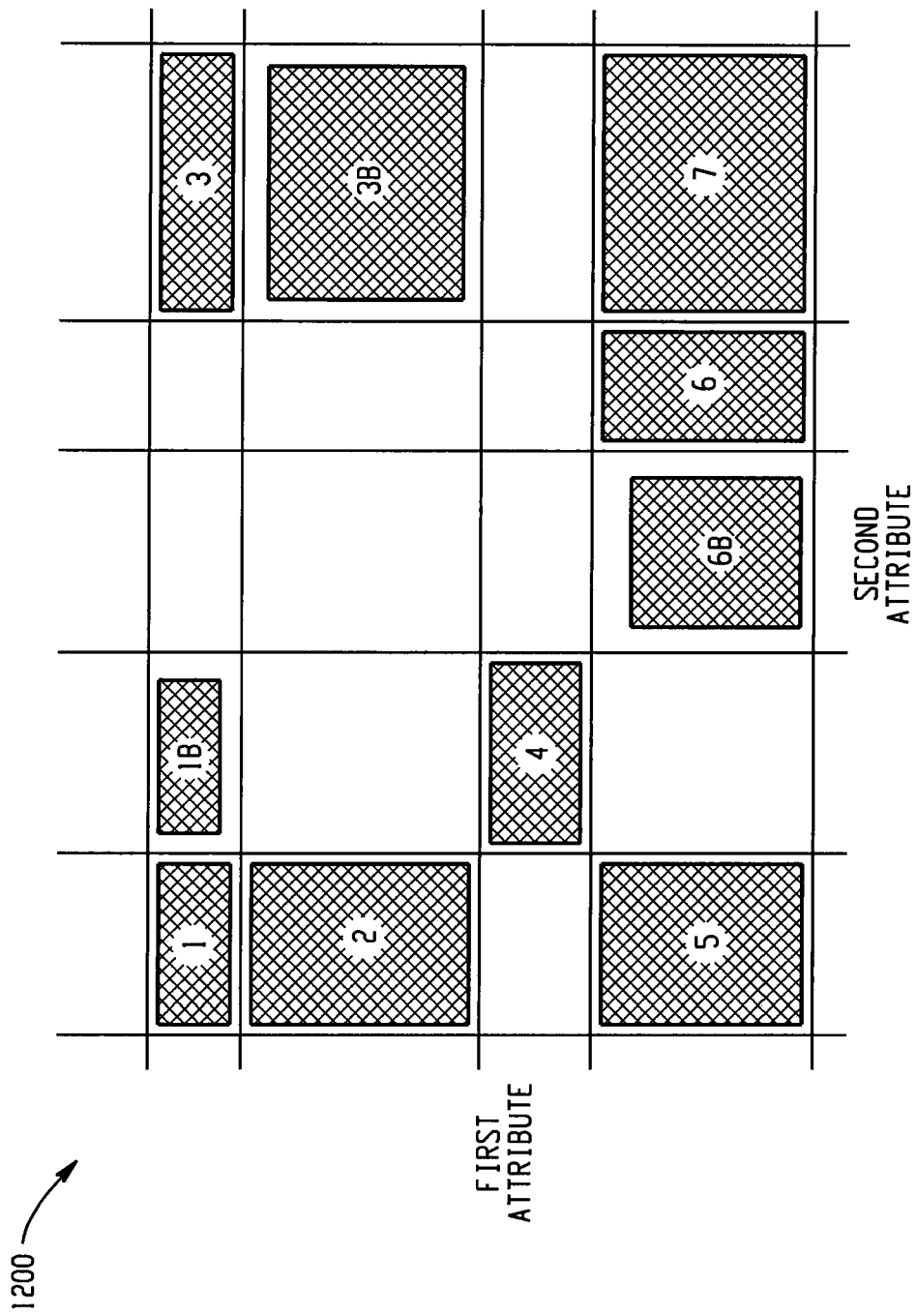
Figure 14:
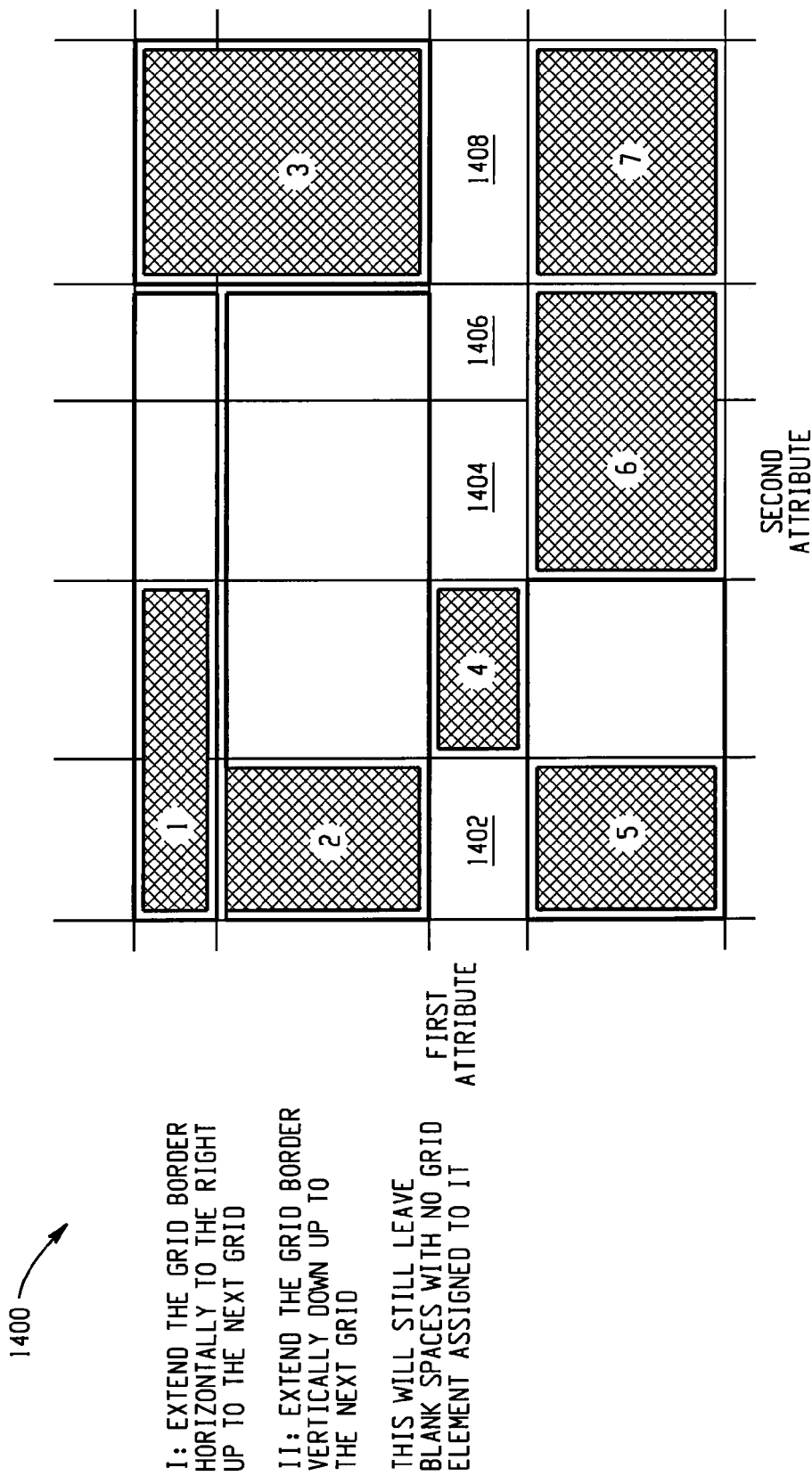
Figure 15:
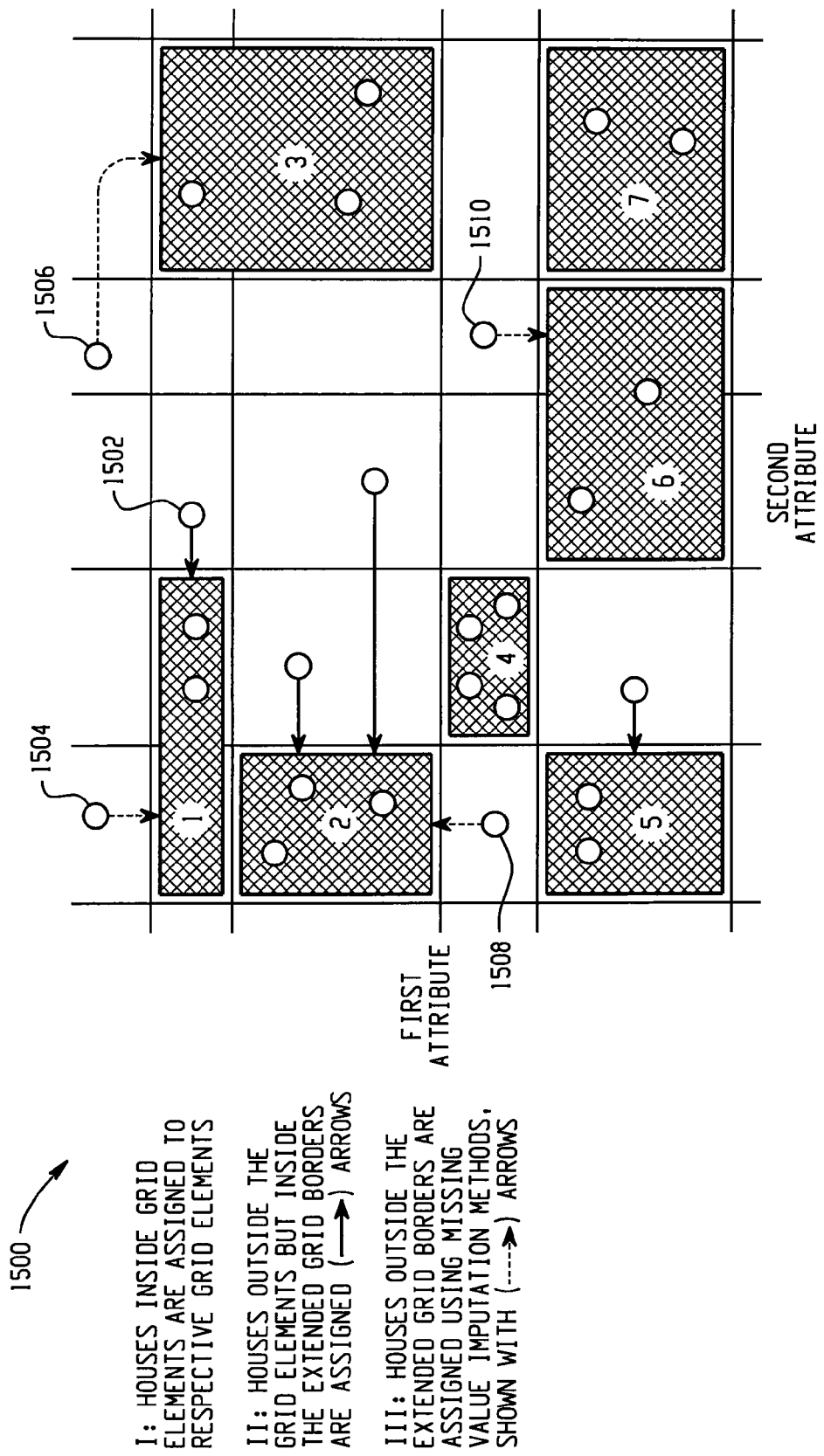

FIGS. 12-15 depict an example target value scoring operation for target entities. In FIG. 12, known targets are assigned to cells of a grid. In this example, known targets are assigned to each of 10 cells. A determination is made as to whether each of the cells containing assigned known entities includes a sufficient number of known entities for successful model training. As shown in FIG. 13, certain of the cells did not contain a sufficient number of known entities, so those cells were combined with other cells to form super cells and to consolidate the number of cells/super cells having assigned known entities to 7. Models are generated for each of the 7 remaining cell groups. In FIG. 14, the borders of certain cells and super cells are extended to encompass cells that do not have associated models. Note that after extension, certain cells (e.g., cells 1402, 1404, 1406, 1408) are not associated with model assigned cells. In FIG. 15, a number of target entities are received, where estimations for target values of the target entities are sought. Target entities may be scored using models associated with cells to which the target entities are assigned (e.g., target entity 1502 is scored using the model associated with group 1). Certain target entities 1504, 1506, 1508, 1510 are assigned to cells that do not fall within any group bounds. In the present example, these target entities 1504, 1506, 1508, 1510 are estimated using a nearest cell group, as indicated by a distance calculation. Other methods for assigning a model for estimating a target value may also be used, such as using distance calculations to perform a weighted average of multiple target value estimates provided by multiple generated models.

Figure 16:
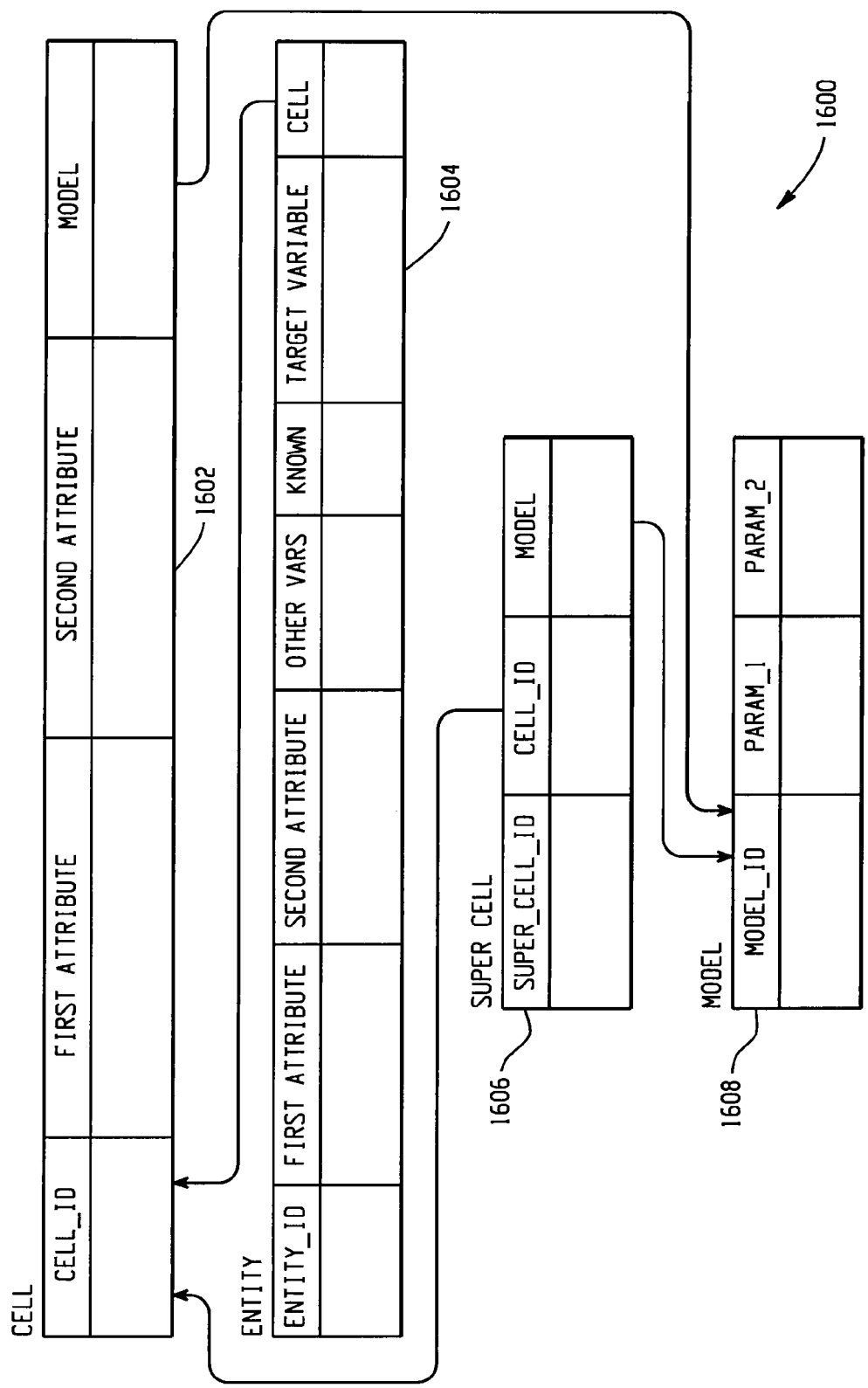
FIG. 16 depicts example data structures for use by a grid estimation engine.

FIG. 16 depicts example data structures for use by a grid estimation engine. A cell table 1602 contains cell records. A cell record tracks a cell identification number, a first attribute value or range of values associated with the cell, a second attribute value or range of values associated with the cell, and a model associated with the cell. An entity table 1604 contains entity data records that may include an entity identification number, a first attribute value associated with the entity, a second attribute value associated with the entity, values for other variables associated with the entity, a flag identifying whether the entity is a known entity having a known target variable value, a target variable value, and a cell assignment, where the cell assignment matches a cell identification number from the cell table 1602. A super cell table 1606 contains super cell data records that include a super cell identification number, a cell identification number that identifies a cell identification number from the cell table 1602, and a model associated with the super cell. A model table 1608 contains model records that include a model identification number and parameter values for the model. The model identification number may be linked to by model fields from the cell table 1602 and the super cell table 1606 to identify which models are associated with which cells or super cells.

FIGS. 17A and 17B depict a numeric example for estimating property values. Data is received for 100 known entities and target entities, where the known entities have values in the available sale price column. Each of the records has first attribute (xcode) and second attribute (ycode) data, and each of the records are assigned to an initial grid cell as indicated by the initial grid number column. Certain cells are combined to form super cells, similar to the operation depicted in FIG. 13. The equivalent expanded grid cell number column identifies changes to the initial grid cell number for an entity based on the expansion to ensure sufficient data for model building. Models are generated for the expanded cells having assigned known entities, such as through use of the sqft area column, the lot sqft area column, and the known target available sale price column. The equivalent grid borders column identifies changes to an entity's grid cell assignment when cells and super cells are expanded, similar to the operation shown in FIG. 14. The equivalent grid used for estimation column identifies any changes in grid cell assignments for target entities assigned to cells that do not have associated models. This assignment is similar to the assignment of target entities 1504, 1506, 1508, and 1510 in FIG. 15. Based on the cell assignments, models are selected for the target entities, and target property values are estimated for those target entities using the models and target entity variables that are inputs to the selected models, such as the sqft area column values and the lot sqft area column values.

Figure 18A:
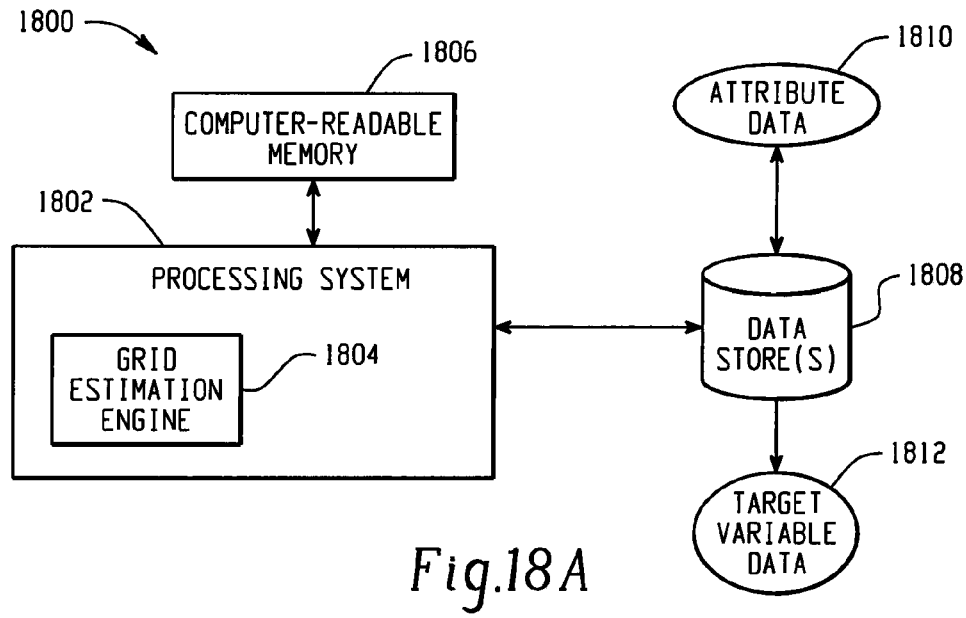
FIGS. 18A, 18B, and 18C depict example systems for use in implementing a grid estimation engine.
Figure 18B:
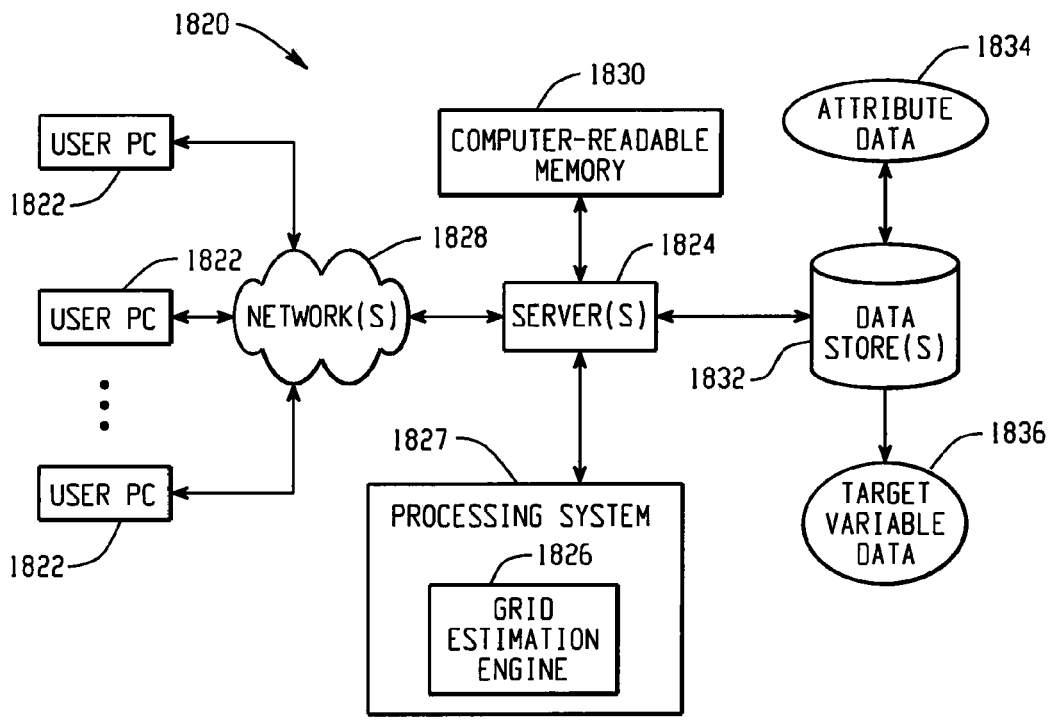
Figure 18C:
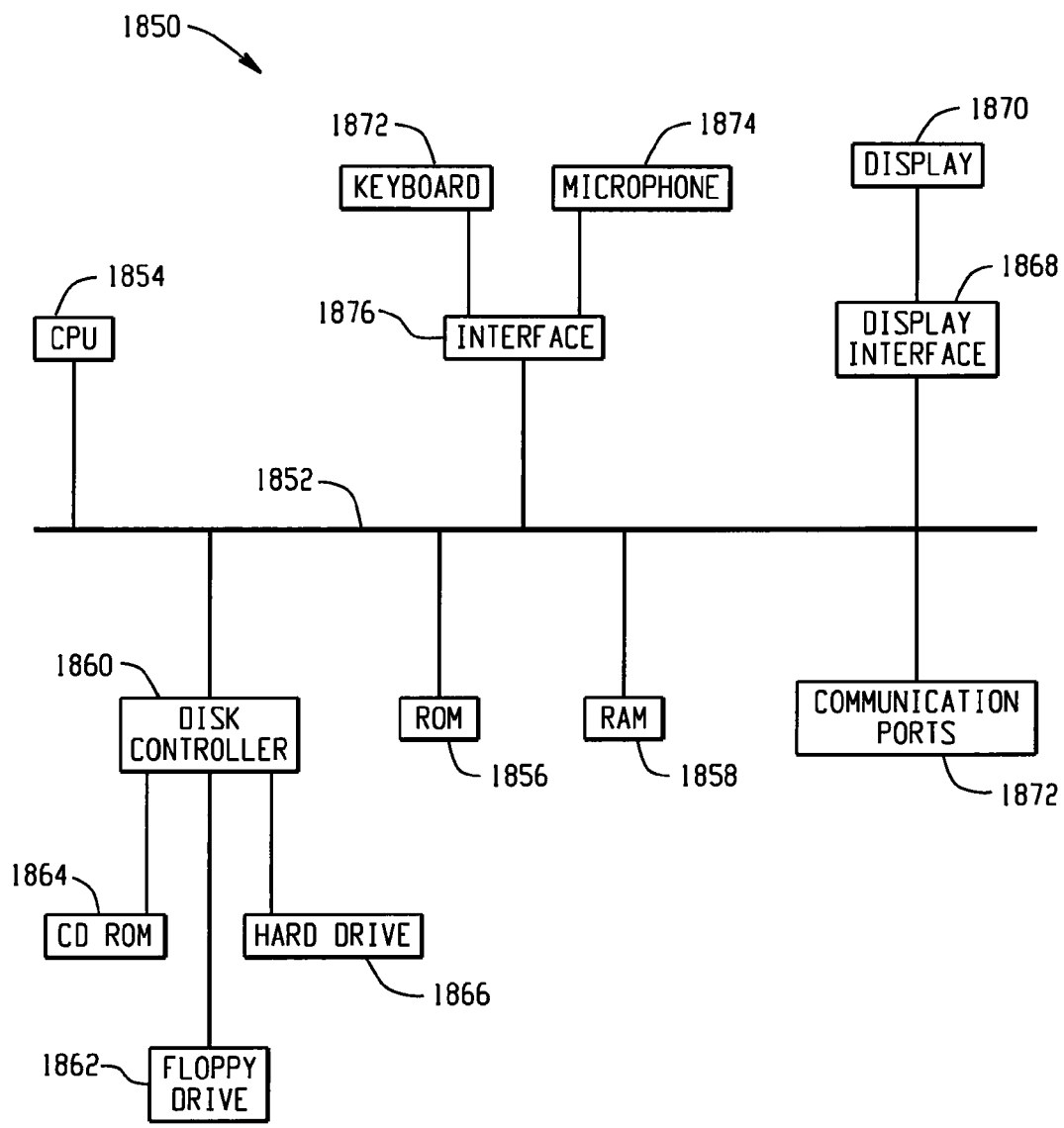

FIGS. 18A, 18B, and 18C depict example systems for use in implementing a grid estimation engine. For example, FIG. 18A depicts an exemplary system 1800 that includes a standalone computer architecture where a processing system 1802 (e.g., one or more computer processors) includes a grid estimation engine 1804 being executed on it. The processing system 1802 has access to a computer-readable memory 1806 in addition to one or more data stores 1808. The one or more data stores 1808 may include attribute data 1810 as well as target variable data 1812.

FIG. 18B depicts a system 1820 that includes a client server architecture. One or more user PCs 1822 accesses one or more servers 1824 running a grid estimation engine 1826 on a processing system 1827 via one or more networks 1828. The one or more servers 1824 may access a computer readable memory 1830 as well as one or more data stores 1832. The one or more data stores 1832 may contain attribute data 1834 as well as target variable data 1836.

FIG. 18C shows a block diagram of exemplary hardware for a standalone computer architecture 1850, such as the architecture depicted in FIG. 18A that may be used to contain and/or implement the program instructions of system embodiments of the present invention. A bus 1852 may serve as the information highway interconnecting the other illustrated components of the hardware. A processing system 1854 labeled CPU (central processing unit) (e.g., one or more computer processors), may perform calculations and logic operations required to execute a program. A processor-readable storage medium, such as read only memory (ROM) 1856 and random access memory (RAM) 1858, may be in communication with the processing system 1854 and may contain one or more programming instructions for performing the method of implementing a grid estimation engine. Optionally, program instructions may be stored on a computer readable storage medium such as a magnetic disk, optical disk, recordable memory device, flash memory, or other physical storage medium. Computer instructions may also be communicated via a communications signal, or a modulated carrier wave.

A disk controller 1860 interfaces one or more optional disk drives to the system bus 1852. These disk drives may be external or internal floppy disk drives such as 1862, external or internal CD-ROM, CD-R, CD-RW or DVD drives such as 1864, or external or internal hard drives 1866. As indicated previously, these various disk drives and disk controllers are optional devices.

Each of the element managers, real-time data buffer, conveyors, file input processor, database index shared access memory loader, reference data buffer and data managers may include a software application stored in one or more of the disk drives connected to the disk controller 1860, the ROM 1856 and/or the RAM 1858. Preferably, the processor 1854 may access each component as required.

A display interface 1868 may permit information from the bus 1852 to be displayed on a display 1870 in audio, graphic, or alphanumeric format. Communication with external devices may optionally occur using various communication ports 1872.

In addition to the standard computer-type components, the hardware may also include data input devices, such as a keyboard 1873, or other input device 1874, such as a microphone, remote control, pointer, mouse and/or joystick.

As additional examples, for example, the systems and methods may include data signals conveyed via networks (e.g., local area network, wide area network, internet, combinations thereof, etc.), fiber optic medium, carrier waves, wireless networks, etc. for communication with one or more data processing devices. The data signals can carry any or all of the data disclosed herein that is provided to or from a device.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Further, as used in the description herein and throughout the claims that follow, the meaning of "each" does not require "each and every" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive or" may be used to indicate situation where only the disjunctive meaning may apply.

It is claimed:

1. A computer-implemented method for estimating a value for a target variable, comprising:
   receiving data corresponding to a plurality of known entities, wherein each known entity has an associated first attribute value, an associated second attribute value, and an associated target variable;
   assigning each known entity to a grid having one or more single cells, wherein each single cell in the grid has an associated first attribute value and an associated second attribute value, and wherein the known entities are assigned to the single cells using the associated attribute values;
   determining whether each single cell includes a pre-determined threshold number of assigned known entities;
   forming one or more super cells by combining one or more single cells having less than the threshold number of known entities;
   generating a model for uncombined single cells having assigned known entities and for each super cell, wherein models are generated using target variable values for known entities assigned to a single cell or a super cell;
   receiving data corresponding to a target entity, wherein the target entity has an associated first attribute value and an associated second attribute value;
   assigning the target entity to a single cell or a super cell, wherein the target entity is assigned using the associated attribute values;
   selecting a model based upon the assigned cell; and
   using the selected model to generate an estimated value for a target variable associated with the target entity.

2. The method of claim 1, wherein each single cell is associated with a range of values for the first attribute and a range of values for the second attribute.

3. The method of claim 1, further comprising:
   associating a particular single cell having no assigned known entities with a single cell or super cell having a particular generated model, wherein the target entity is assigned to the particular cell, wherein the particular generated model is used to generate the estimate for the target entity.

4. The method of claim 1, further comprising:
   determining single cells to combine based upon target variable values for the known entities.

5. The method of claim 4, wherein a first single cell is determined to be combined with a second single cell based upon a similarity of target variable values among known entities assigned to the first single cell and the second single cell.

6. The method of claim 1, wherein the grid is three-dimensional, wherein each of the known entities is assigned to one of the plurality of single cells based upon the values for a first variable, a second variable, and a third variable.

7. The method of claim 6, wherein the first variable and the second variable form coordinates for identifying a physical location.

8. The method of claim 1, wherein the known entities and the target entity are real estate properties, and wherein the target variable is a property value.

9. The method of claim 8, wherein the property value for the target entity is used in assessing property taxes.

10. The method of claim 1, wherein adjacent single cells are combined to form a super cell.

11. The method of claim 1, wherein a particular single cell is associated with multiple models, wherein the target entity is assigned to the particular single cell, and wherein the estimate is generated using the multiple models.

12. The method of claim 11, wherein the estimate is generated based upon a weighted average of outputs of the multiple models.

13. The method of claim 1, wherein the target entity is assigned to a single cell that does not have a model, wherein a model is selected based upon a distance calculation.

14. The method of claim 13, wherein the distance calculation identifies a single cell or super cell having a model that is closest to the target entity.

15. The method of claim 1, wherein the single cells of the grid are defined so that no more than N known entities are assigned to any single cell.

16. The method of claim 1, wherein the single cells of the grid are represented by a plurality of single cell data records stored in a computer-readable medium, wherein a single cell data record identifies the value for the first attribute and the value for the second attribute associated with the single cell.

17. The method of claim 16, wherein the plurality of known entities are represented by a plurality of entity data records stored in the computer-readable medium, wherein an entity data record for an entity identifies the value of the first attribute associated with the entity, the value of the second attribute associated with the known entity, and a single cell record that represents a single cell to which the known entity is assigned.

18. The method of claim 17, wherein a super cell is represented by one or more super cell records stored in the computer-readable medium, wherein the one or more super cell records identify a plurality of single cells combined to form the super cell.

19. The method of claim 18, wherein a model is represented by a model record stored in the computer-readable medium, wherein the model record identifies one or more model parameters, and wherein a single cell data record or a super cell record identifies a model record for a generated model.

20. The method of claim 1, wherein the model is generated based upon third attribute values associated with the known entities, wherein the third attribute values are time-series values.

21. A system for estimating a value for a target variable, comprising:
one or more processors;
one or more computer-readable storage media containing instructions configured to cause the one or more processors to perform operations including:
receiving data corresponding to a plurality of known entities, wherein each known entity has an associated first attribute value, an associated second attribute value, and an associated target variable;
assigning each known entity to a grid having one or more single cells, wherein each single cell in the grid has an associated first attribute value and an associated second attribute value, and wherein the known entities are assigned to the single cells using the associated attribute values;
determining whether each single cell includes a predetermined threshold number of assigned known entities;
forming one or more super cells by combining one or more single cells having less than the threshold number of known entities;
generating a model for uncombined single cells having assigned known entities and for each super cell, wherein models are generated using target variable values for known entities assigned to a single cell or a super cell;
receiving data corresponding to a target entity, wherein the target entity has an associated first attribute value and an associated second attribute value;
assigning the target entity to a single cell or a super cell, wherein the target entity is assigned using the associated attribute values;
selecting a model based upon the assigned cell; and
using the selected model to generate an estimated value for a target variable associated with the target entity.

22. A computer-program product for estimating a value for a target variable, tangibly embodied in a non-transitory machine-readable storage medium, including instructions configured to cause a data processing system to:
receive data corresponding to a plurality of known entities, wherein each known entity has an associated first attribute value, an associated second attribute value, and an associated target variable;
assign each known entity to a grid having one or more single cells, wherein each single cell in the grid has an associated first attribute value and an associated second attribute value, and wherein the known entities are assigned to the single cells using the associated attribute values;
determine whether each single cell includes a pre-determined threshold number of assigned known entities;
form one or more super cells by combining one or more single cells having less than the threshold number of known entities;
generate a model for uncombined single cells having assigned known entities and for each super cell, wherein models are generated using target variable values for known entities assigned to a single cell or a super cell;
receive data corresponding to a target entity, wherein the target entity has an associated first attribute value and an associated second attribute value;
assign the target entity to a single cell or a super cell, wherein the target entity is assigned using the associated attribute values;
select a model based upon the assigned cell; and
use the selected model to generate an estimated value for a target variable associated with the target entity.

23. The method of claim 1, wherein single cells are combined horizontally or vertically.

24. The method of claim 1, wherein a super cell is non-rectangular.

25. The system of claim 21, wherein each single cell is associated with a range of values for the first attribute and a range of values for the second attribute.

26. The system of claim 21, further comprising instructions configured to cause the one or more processors to perform operations including:
associating a particular single cell having no assigned known entities with a single cell or super cell having a particular generated model, wherein the target entity is assigned to the particular cell, wherein the particular generated model is used to generate the estimate for the target entity.

27. The system of claim 21, further comprising instructions configured to cause the one or more processors to perform operations including:
determining single cells to combine based upon target variable values for the known entities.

28. The system of claim 27, wherein a first single cell is determined to be combined with a second single cell based upon a similarity of target variable values among known entities assigned to the first single cell and the second single cell.

29. The system of claim 21, wherein the grid is three-dimensional, wherein each of the known entities are assigned to one of the plurality of single cells based upon the values for a first variable, a second variable, and a third variable.

30. The system of claim 29, wherein the first variable and the second variable form coordinates for identifying a physical location.

31. The system of claim 21, wherein the known entities and the target entity are real estate properties, and wherein the target variable is a property value.

32. The system of claim 31, wherein the property value for the target entity is used in assessing property taxes.

33. The system of claim 21, wherein adjacent single cells are combined to form a super cell.

34. The system of claim 21, wherein a particular single cell is associated with multiple models, wherein the target entity is assigned to the particular single cell, and wherein the estimate is generated using the multiple models.

35. The system of claim 34, wherein the estimate is generated based upon a weighted average of outputs of the multiple models.

36. The system of claim 21, wherein the target entity is assigned to a single cell that does not have a model, wherein a model is selected based upon a distance calculation.

37. The system of claim 36, wherein the distance calculation identifies a single cell or super cell having a model that is closest to the target entity.

38. The system of claim 21, wherein the single cells of the grid are defined so that no more than N known entities are assigned to any single cell.

39. The system of claim 21, wherein the single cells of the grid are represented by a plurality of single cell data records stored in a computer-readable medium, wherein a single cell data record identifies the value for the first attribute and the value for the second attribute associated with the single cell.

40. The system of claim 39, wherein the plurality of known entities are represented by a plurality of entity data records stored in the computer-readable medium, wherein an entity data record for an entity identifies the value of the first attribute associated with the entity, the value of the second attribute associated with the known entity, and a single cell record that represents a single cell to which the known entity is assigned.

41. The system of claim 40, wherein a super cell is represented by one or more super cell records stored in the computer-readable medium, wherein the one or more super cell records identify a plurality of single cells combined to form the super cell.

42. The system of claim 41, wherein a model is represented by a model record stored in the computer-readable medium, wherein the model record identifies one or more model parameters, and wherein a single cell data record or a super cell record identifies a model record for a generated model.

43. The system of claim 21, wherein the model is generated based upon third attribute values associated with the known entities, wherein the third attribute values are time-series values.

44. The system of claim 21, wherein single cells are combined horizontally or vertically.

45. The system of claim 21, wherein a super cell is non-rectangular.

46. The non-transitory machine-readable storage medium of claim 22, wherein each single cell is associated with a range of values for the first attribute and a range of values for the second attribute.

47. The non-transitory machine-readable storage medium of claim 22, further comprising instructions configured to cause a data processing system to:
associate a particular single cell having no assigned known entities with a single cell or super cell having a particular generated model, wherein the target entity is assigned to the particular cell, wherein the particular generated model is used to generate the estimated value for the target variable.

48. The non-transitory machine-readable storage medium of claim 22, further comprising instructions configured to cause a data processing system to:
determine single cells to combine based upon target variable values for the known entities.

49. The non-transitory machine-readable storage medium of claim 48, wherein a first single cell is determined to be combined with a second single cell based upon a similarity of target variable values among known entities assigned to the first single cell and the second single cell.

50. The non-transitory machine-readable storage medium of claim 22, wherein the grid is three-dimensional, wherein each of the known entities are assigned to one of the plurality of single cells based upon the values for a first variable, a second variable, and a third variable.

51. The non-transitory machine-readable storage medium of claim 50, wherein the first variable and the second variable form coordinates for identifying a physical location.

52. The non-transitory machine-readable storage medium of claim 22, wherein the known entities and the target entity are real estate properties, and wherein the target variable is a property value.

53. The non-transitory machine-readable storage medium of claim 52, wherein the property value for the target entity is used in assessing property taxes.

54. The non-transitory machine-readable storage medium of claim 22, wherein adjacent single cells are combined to form a super cell.

55. The non-transitory machine-readable storage medium of claim 22, wherein a particular single cell is associated with multiple models, wherein the target entity is assigned to the particular single cell, and wherein the estimate is generated using the multiple models.

56. The non-transitory machine-readable storage medium of claim 55, wherein the estimate is generated based upon a weighted average of outputs of the multiple models.

57. The non-transitory machine-readable storage medium of claim 22, wherein the target entity is assigned to a single cell that does not have a model, wherein a model is selected based upon a distance calculation.

58. The non-transitory machine-readable storage medium of claim 22, wherein the distance calculation identifies a single cell or super cell having a model that is closest to the target entity.

59. The non-transitory machine-readable storage medium of claim 22, wherein the single cells of the grid are defined so that no more than N known entities are assigned to any single cell.

60. The non-transitory machine-readable storage medium of claim 22, wherein the single cells of the grid are represented by a plurality of single cell data records stored in a computer-readable medium, wherein a single cell data record identifies the value for the first attribute and the value for the second attribute associated with the single cell.

61. The non-transitory machine-readable storage medium of claim 60, wherein the plurality of known entities are represented by a plurality of entity data records stored in the computer-readable medium, wherein an entity data record for an entity identifies the value of the first attribute associated with the entity, the value of the second attribute associated with the known entity, and a single cell record that represents a single cell to which the known entity is assigned.

62. The non-transitory machine-readable storage medium of claim 61, wherein a super cell is represented by one or more super cell records stored in the computer-readable medium, wherein the one or more super cell records identify a plurality of single cells combined to form the super cell.

63. The non-transitory machine-readable storage medium of claim 62, wherein a model is represented by a model record stored in the computer-readable medium, wherein the model record identifies one or more model parameters, and wherein a single cell data record or a super cell record identifies a model record for a generated model.

64. The non-transitory machine-readable storage medium of claim 22, wherein the model is generated based upon third attribute values associated with the known entities, wherein the third attribute values are time-series values.

65. The non-transitory machine-readable storage medium of claim 22, wherein single cells are combined horizontally or vertically.

66. The non-transitory machine-readable storage medium of claim 22, wherein a super cell is non-rectangular.

* * * * *